(12) United States Patent
Kohara

(10) Patent No.: US 8,035,867 B2
(45) Date of Patent: Oct. 11, 2011

(54) IMAGE READING APPARATUS WITH READING MODE SELECTION UNIT AND IMAGE FORMING SYSTEM

(75) Inventor: Ryuichi Kohara, Tokyo (JP)

(73) Assignee: Oki Data Corporation, Tokyo (JP)

( * ) Notice: Subject to any disclaimer, the term of this patent is extended or adjusted under 35 U.S.C. 154(b) by 986 days.

(21) Appl. No.: 11/265,466

(22) Filed: Nov. 3, 2005

(65) Prior Publication Data

US 2006/0103895 A1    May 18, 2006

(30) Foreign Application Priority Data

Nov. 18, 2004   (JP) ................................. 2004-333946

(51) Int. Cl.
*H04N 1/04*   (2006.01)
*H04N 1/40*   (2006.01)

(52) U.S. Cl. .................... 358/474; 358/486; 358/449

(58) Field of Classification Search ................. None
See application file for complete search history.

(56) References Cited

U.S. PATENT DOCUMENTS

| | | | | |
|---|---|---|---|---|
| 5,473,445 A * | 12/1995 | Takei et al. | ................... | 358/474 |
| 5,508,820 A * | 4/1996 | Kabeya | ........................ | 358/404 |
| 5,815,770 A * | 9/1998 | Ogino | ............................ | 399/87 |
| 6,721,074 B1 * | 4/2004 | Kao | .............................. | 358/496 |
| 2002/0015189 A1 * | 2/2002 | Miyajima | ..................... | 358/404 |
| 2004/0169902 A1 * | 9/2004 | Yaguchi | ......................... | 358/524 |

FOREIGN PATENT DOCUMENTS

JP         2000-151907        5/2000

* cited by examiner

*Primary Examiner* — Chan S Park
*Assistant Examiner* — Ming Hon
(74) *Attorney, Agent, or Firm* — Kubotera & Associates, LLC

(57) ABSTRACT

An image reading apparatus includes a reading condition receiving unit for receiving a reading condition; an image reading unit for reading the original according to the reading condition to obtain image information; a storage unit for storing the image information; a reading mode selection unit for selecting a first reading mode or a second reading mode according to a result of comparison between an image information amount and a memory capacity of the storage unit; and a data reading unit for reading the image information from the storage unit according to the reading mode. The data reading unit reads the image information per page in the first reading mode. The data reading unit reads the image information per block in the second reading mode.

14 Claims, 23 Drawing Sheets

| 43-1-1 | 43-1-2 | 43-1-3 | 43-1-4 | 43-1-5 |
|---|---|---|---|---|
| Resolution | Color number/color scale | Image size | Reading time | Reading speed |
| 300dpi | (24bit) | A3 | 6.0 | 8.7 Mbyte |
| | | A4 | 3.0 | 8.7 Mbyte |
| | | ⋮ | ⋮ | ⋮ |
| | (8bit) | A3 | 2.8 | 6.2 Mbyte |
| | | A4 | 1.4 | 6.2 Mbyte |
| | | ⋮ | ⋮ | ⋮ |
| | ⋮ | ⋮ | ⋮ | ⋮ |
| 600dpi | (24bit) | A3 | 19.8 | 10.5 Mbyte |
| | | A4 | 9.9 | 10.5 Mbyte |
| | | ⋮ | ⋮ | ⋮ |
| | (8bit) | A3 | 9.6 | 7.3 Mbyte |
| | | A4 | 4.8 | 7.3 Mbyte |
| | | ⋮ | ⋮ | ⋮ |
| ⋮ | ⋮ | ⋮ | ⋮ | ⋮ |

Fig. 20

IMAGE READING APPARATUS WITH READING MODE SELECTION UNIT AND IMAGE FORMING SYSTEM

BACKGROUND OF THE INVENTION AND RELATED ART STATEMENT

The present invention relates to an image reading apparatus and an image forming system. In particular, the present invention relates to an image reading apparatus and an image forming system capable of reading both sides of a sheet.

Patent Reference 1 has disclosed a conventional image reading apparatus capable of reading both sides of a sheet simultaneously. In the image reading apparatus, two reading sensors are provided for reading images on both sides of an original. Image data per page are temporarily stored in a memory, and sent to an external device. When an image is read with high resolution, a large amount of data is stored in the memory. Accordingly, it is necessary to provide a large capacity memory for obtaining a high quality image. Patent Reference 1: Japanese Patent Publication No. 2000-151907

In view of the problems described above, an object of the present invention is to provide an image reading apparatus and image forming system, in which it is possible to transmit image data at a high speed without a large capacity memory. Accordingly, it is possible to maintain high quality image, thereby reducing cost.

Further objects and advantages of the invention will be apparent from the following description of the invention.

SUMMARY OF THE INVENTION

In order to attain the objects described above, according to the present invention, an image reading apparatus includes a first reading unit for reading a front side of an original and a second reading unit for reading a backside of the original according to an image reading condition set by an operator. The image reading apparatus also includes a first storage unit for storing image data of the front side and a second storage unit for storing image data of the backside, respectively. The image reading apparatus also includes a reading mode selection unit. The reading mode selection unit compares an amount of reading information according to the image reading condition with memory capacities of the first and second storage units. When the memory capacities are smaller than the amount of reading information, the image data stored in the first and second storage units are read per block. When the memory capacities are larger than the amount of reading information, the image data stored in the first and second storage units are read per page.

In the invention, the reading mode selection unit compares the amount of the reading information according to the image reading condition set by an operator with the memory capacities of the first and second storage units. Then, the reading mode selection unit selects one of a reading-per-block mode and a reading-per-page mode. Accordingly, when the memory capacities are larger than the amount of the reading information, the reading-per-page mode is selected, thereby increasing a data transmission speed. When the memory capacities are smaller than the amount of the reading information, the reading-per-block mode is selected, thereby making it possible to transmit data with a small capacity memory.

When the memory capacities are set according to normal image quality, the reading-per-block mode is selected only when it is necessary to read an original with a resolution higher than the normal image quality. Accordingly, it is possible to transmit image data at a high speed without a large capacity memory. Further, it is possible to maintain high quality image, thereby reducing cost.

BRIEF DESCRIPTION OF THE DRAWINGS

FIG. 20 is a view showing a reading speed table;

DETAILED DESCRIPTION OF PREFERRED EMBODIMENTS

Hereunder, embodiments of the present invention will be explained with reference to the accompanying drawings.

First Embodiment

Figure 1:
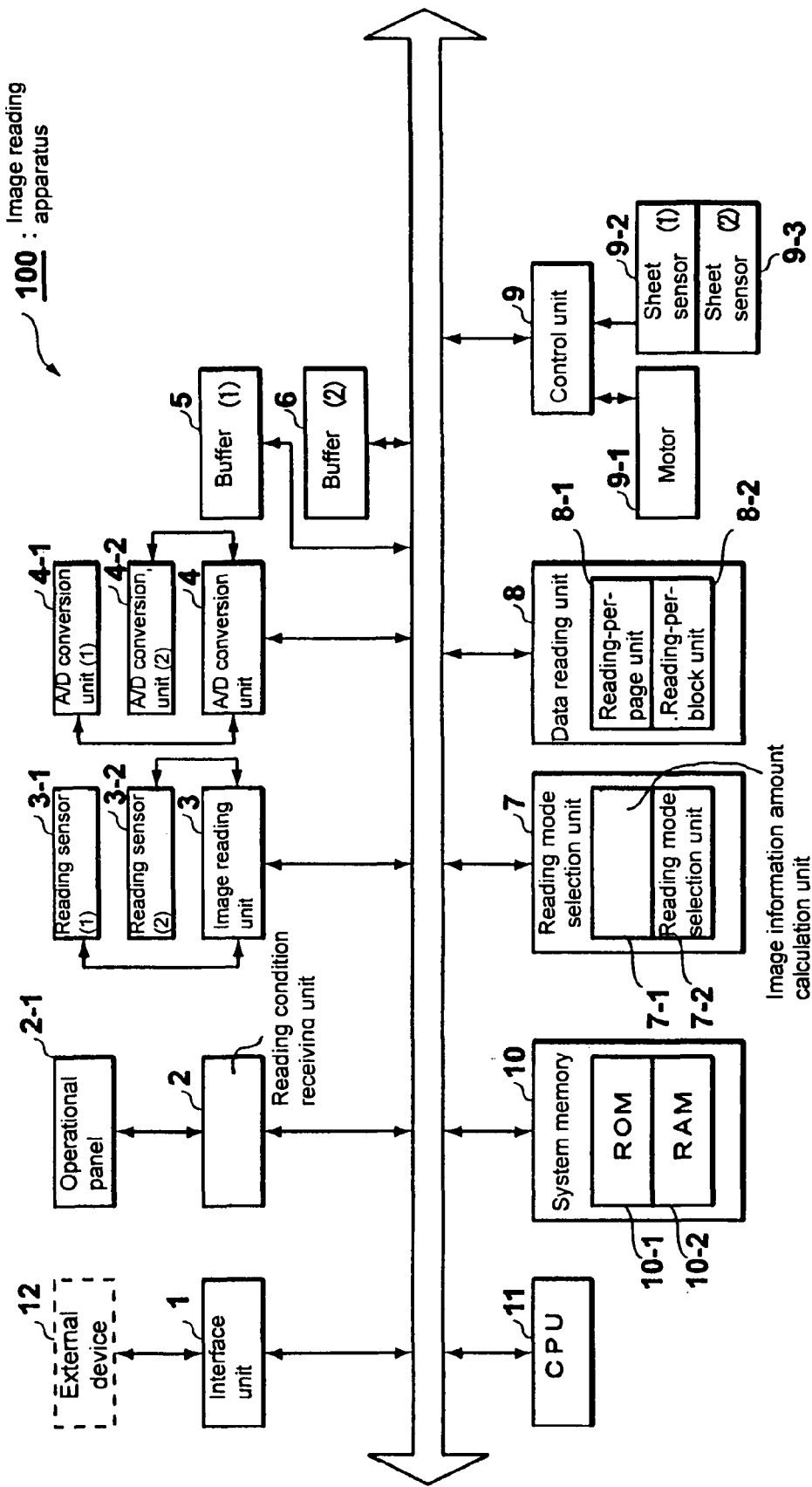
FIG. 1 is a schematic block diagram of an image reading apparatus according to a first embodiment of the present invention.

FIG. 1 is a schematic block diagram of an image reading apparatus 100 according to a first embodiment of the present invention. The image reading apparatus 100 includes an interface unit 1; a reading condition receiving unit 2; an image reading unit 3; a A/D conversion unit 4; a buffer (1) 5; a buffer (2) 6; a reading mode selection unit 7; a data reading unit 8; a control unit 9; a system memory 10; and a CPU 11.

The interface unit 1 is formed of an interface circuit for connecting the image reading apparatus 100 to an external device 12 such as a printing device. The reading condition receiving unit 2 receives an operational instruction from an operator through an operational panel 2-1, and displays a control process of the image reading apparatus 100. In the embodiment, the reading condition receiving unit 2 receives image reading conditions such as an original size, reading resolution, and color selection. In the reading condition receiving unit 2, the CPU 11 executes a specific program stored in an ROM 10-1.

The image reading unit 3 simultaneously reads image information or image data on a front side and a backside of a double side original (not shown) transported on a transport path (not shown) through a reading sensor (1) 3-1 and a reading sensor (2) 3-2. Then, the image reading unit 3 sends the image data (analog data) to the A/D conversion unit 4. The CPU 11 executes a specific program stored in the ROM 10-1 to start the image reading unit 3.

The reading sensor (1) 3-1 and the reading sensor (2) 3-2 are formed of LED allays as a light source for irradiating light on the original; rod lens allays for receiving reflective light; photo-transistors for converting light conversed by the rod lens allays to an electric signal; and control circuits for obtaining the image data (analog data) from the photo-transistors. The reading sensor (1) 3-1 and the reading sensor (2) 3-2 are arranged on upper and lower surfaces of the transport path to sandwich the original transported on the transport path.

The A/D conversion unit 4 controls an A/D conversion unit (1) 4-1 and an A/D conversion unit (2) 4-2 to convert the image information (analog data) received from the image reading unit 3 to digital data. Then, data output from the A/D conversion unit (1) 4-1 is divided into specific blocks and stored in the buffer (1) 5 at a specific address, and data output from the A/D conversion unit (2) 4-2 is divided into specific blocks and stored in the buffer (2) 6 at a specific address. When a reading-per-page mode (described later) is selected, the data may be stored from a first address without dividing into the blocks. The CPU 11 executes a specific program stored in the ROM 10-1 to start the A/D conversion unit 4.

The buffer (1) 5 is a memory for storing the image information (digital data) received from the A/D conversion unit (1) 4-1 according to the control of the A/D conversion unit 4. The buffer (2) 6 is a memory for storing the image information (digital data) received from the A/D conversion unit (2) 4-2 according to the control of the A/D conversion unit 4. Memory capacities (Smem) of the buffer (1) 5 and the buffer (2) 6 are set corresponding to an amount of reading information under a most frequently used reading condition according to the image reading condition desired by the operator. In general, the amount of the reading information under the most frequently used reading condition is determined empirically according to a usage history of the apparatus. The buffer (1) 5 may have a memory capacity (Smem1) different from a memory capacity (Smem2) of the buffer (2) 6. In the embodiment, they have a same memory capacity.

The reading mode selection unit 7 compares the reading information amount (Sscan) with the memory capacities (Smem) of the buffer (1) 5 and the buffer (2) 6, so that the reading mode selection unit 7 selects the reading-per-block mode or the reading-per-page mode based on the comparison result. The reading mode selection unit 7 includes an image information amount calculation unit 7-1 and an reading mode selection unit 7-2. Typically, when the reading information amount (Sscan) is equal to or smaller than the memory capacities (Smem), the reading mode selection unit 7 selects the reading-per-page mode. When the reading information amount (Sscan) is greater than the memory capacities (Smem), the reading mode selection unit 7 selects the reading-per-block mode.

In the reading-per-page mode, the image information stored in the buffer (1) 5 and the buffer (2) 6 is read per page. In the reading-per-block mode, the image information stored in the buffer (1) 5 and the buffer (2) 6 is read per block. The CPU 11 executes a specific program stored in the ROM 10-1 to start the reading mode selection unit 7.

The data reading unit 8 reads the image information from the buffer (1) 5 and the buffer (2) 6, and sends the image information to the external device 12 through the interface unit 1. The data reading unit 8 includes a reading-per-page unit 8-1 and a reading-per-block unit 8-2. The CPU 11 executes a specific program stored in the ROM 10-1 to start the data reading unit 8. The reading-per-page unit 8-1 executes the reading-per-page mode, and the reading-per-block unit 8-2 executes the reading-per-block mode.

Figure 2A:
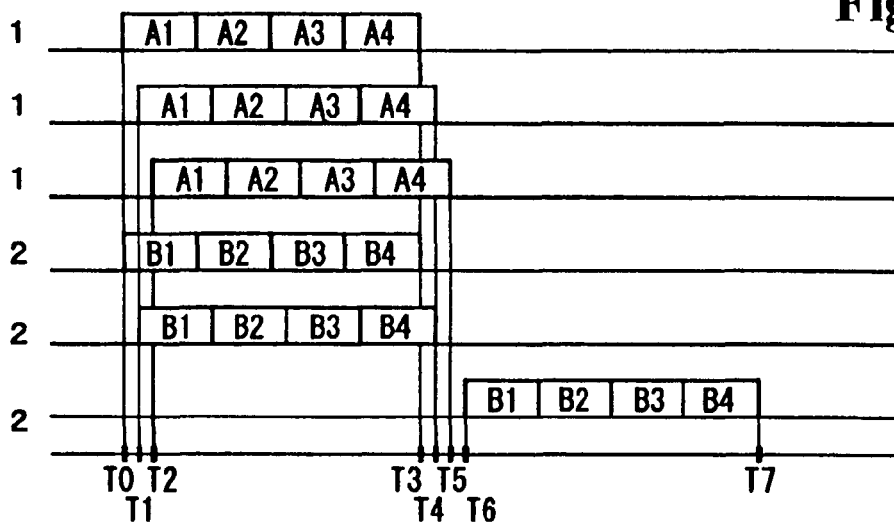
FIGS. 2(A) to 2(C) are schematic charts for explaining a reading mode of the image reading apparatus.
Figure 2B:
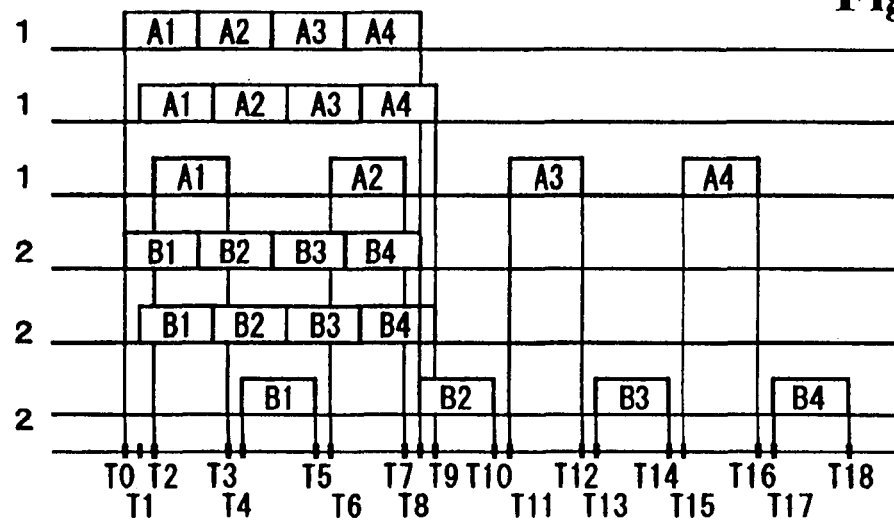
Figure 2C:
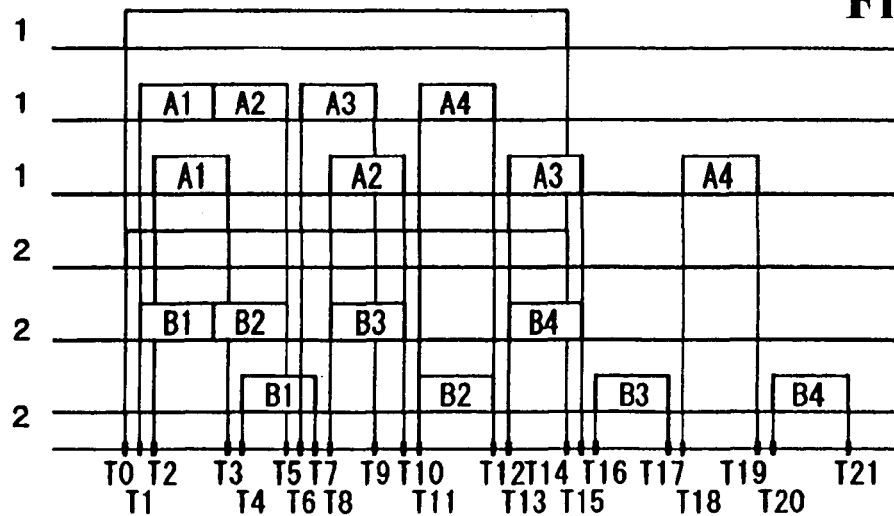

FIGS. 2(A) to 2(B) are schematic charts for explaining a reading mode of the image reading apparatus. FIG. 2(A) is a time chart of the reading-per-page mode in which Sscan is equal to or smaller than Smem. FIG. 2(B) is a time chart of the reading-per-block mode in which Sscan is equal to or smaller than Smem. FIG. 2(C) is a time chart of the reading-per-block mode in which Sscan is greater than Smem.

In FIG. 2(A), the time chart represents, from the top, a reading operation of the reading sensor (1) 3-1 (FIG. 1); a data storing operation in the buffer (1) 5 (FIG. 1); a data reading operation from the buffer (1) 5 (FIG. 1); a reading operation of the reading sensor (2) 3-2 (FIG. 1); a data storing operation in the buffer (2) 6 (FIG. 1) and a data reading operation from the buffer (2) 6 (FIG. 1). A lower axis represents time.

The reading sensor (1) 3-1 and the reading sensor (2) 3-2 start reading the front side and backside of the original simultaneously at time TO. At time T1, the A/D conversion unit 4 (FIG. 1) converts the image information from the reading sensor (1) 3-1 and the reading sensor (2) 3-2 to digital data, and stores the digital data to the buffer (1) 5 and the buffer (2) 6. There is a time lag from the start of reading by the reading sensor (1) 3-1 and the reading sensor (2) 3-2 to the start of storing in the buffer (1) 5 and the buffer (2) 6.

At time T2, the reading-per-page unit 8-1 (FIG. 1) of the data reading unit 8 (FIG. 1) starts reading the image information (digital data) stored in the buffer (1) 5 from a front address and sending the image information to the external device 12 (FIG. 1) through the interface unit 1 (FIG. 1). In the process, the data reading unit 8 reads and sends the image information through one single communication line. Accordingly, it is not possible to send the image information (digital data) stored in the buffer (2) 6 to the external device 12 at the same time.

At time T3, the reading sensor (1) 3-1 and the reading sensor (2) 3-2 complete reading the image information (analog data). At time T4, the A/D conversion unit 4 completes storing the image information (digital data) to the buffer (1) 5 and the buffer (2) 6. At time T5, the reading-per-page unit 8-1 completes reading the image information from the buffer (1) 5 and sending the same to the external device 12.

At time T6, the reading-per-page unit 8-1 (FIG. 1) of the data reading unit 8 (FIG. 1) starts reading the image information (digital data) stored in the buffer (2) 6 from a front address and sending the image information to the external device 12 (FIG. 1) through the interface unit 1 (FIG. 1). Note that there is a time lag between T5 and T6 for setting an address of the image information to be read. At time T7, the reading-per-page unit 8-1 of the data reading unit 8 completes reading the image information from the buffer (2) 6 and sending the same to the external device 12 through the interface unit 1.

In FIG. 2(B), the time chart represents, from the top, the reading operation of the reading sensor (1) 3-1; the data storing operation in the buffer (1) 5; the data reading operation from the buffer (1) 5; the reading operation of the reading sensor (2) 3-2; the data storing operation in the buffer (2) 6 and the data reading operation from the buffer (2) 6. A lower axis represents time.

The reading sensor (1) 3-1 and the reading sensor (2) 3-2 start reading the front side and backside of the original simultaneously at time T0. At time T1, the A/D conversion unit 4 (FIG. 1) converts the image information (analog data) from the reading sensor (1) 3-1 and the reading sensor (2) 3-2 to digital data, and stores the digital data to the buffer (1) 5 and the buffer (2) 6. There is a time lag from the start of reading by the reading sensor (1) 3-1 and the reading sensor (2) 3-2 to the start of storing in the buffer (1) 5 and the buffer (2) 6.

At time T2, the reading-per-block unit 8-2 (FIG. 1) of the data reading unit 8 starts reading the image information (digital data) stored in the buffer (1) 5 from a front address of Block A1 and sending the image information to the external device 12 through the interface unit 1. In the process, the data reading unit 8 reads and sends the image information through one single communication line. Accordingly, it is not possible to send the image information (digital data) stored in the buffer (2) 6 to the external device 12 at the same time.

At time T3, the reading-per-block unit 8-2 completes reading the image information of Block Al in the buffer (1) 5, and sending the image information to the external device 12. At time T4, the reading-per-block unit 8-2 (FIG. 1) of the data reading unit 8 starts reading the image information (digital data) stored in the buffer (2) 6 from a front address of Block B1 and sending the image information to the external device 12 through the interface unit 1. Note that there is a time lag between T3 and T4 for setting an address of the image information to be read. At time T5, the reading-per-block unit 8-2 completes reading the image information of Block B1 in the buffer (2) 6 and sending the same to the external device 12.

At time T6, the reading-per-block unit 8-2 of the data reading unit 8 starts reading the image information (digital data) stored in the buffer (1) 5 from a front address of Block A2 and sending the image information to the external device 12 through the interface unit 1. Note that there is a time lag between T5 and T6 for setting an address of the image information to be read. At time T7, the reading-per-block unit 8-2 completes reading the image information of Block A2 in the buffer (1) 5 and sending the same to the external device 12.

At time T8, the reading sensor (1) 3-1 and the reading sensor (2) 3-2 complete reading the image information (analog data). At this time, the reading-per-block unit 8-2 starts reading the image information (digital data) stored in the buffer (2) 6 from a front address of Block B2 and sending the image information to the external device 12 through the interface unit 1. Note that there is a time lag between T7 and T8 for setting an address of the image information to be read. At time T9, the A/D conversion unit 4 completes storing the image information (digital data) to the buffer (1) 5 and the buffer (2) 6. At time T10, the reading-per-block unit 8-2 completes reading the image information of Block B2 in the buffer (2) 6 and sending the same to the external device 12.

Similarly, during time from T11 to T18, the reading-per-block unit 8-2 alternately reads the image information (digital data) of Block A2, Block B3, Block A4, and Block B4 in the buffer (1) 5 and the buffer (2) 6, and sending the image information to the external device 12.

A comparison between the processes shown in FIGS. 2(A) and 2(B) will be explained next. When the reading-per-page unit 8-1 reads an image, once a reading address is set at the front address of the image data stored in the buffer (1) 5 or the buffer (2) 6, it is not necessary to set the reading address until the image data stored in the buffer (1) 5 or the buffer (2) 6 are completely read. On the other hand, when the reading-per-block unit 8-2 reads an image, the reading-per-block unit 8-2 alternately reads the image data stored in the buffer (1) 5 and the buffer (2) 6 per block. Accordingly, each time the block is switched, it is necessary to seek an address of an area where the block is retained. As a result, it takes long time (time lag) to re-set the reading address, thereby increasing the whole process time.

The reading-per-block mode will be explained next, in which Sscan is greater than Smem. In FIG. 2(C), the time chart represents, from the top, the reading operation of the reading sensor (1) 3-1; the data storing operation in the buffer (1) 5; the data reading operation from the buffer (1) 5; the reading operation of the reading sensor (2) 3-2; the data storing operation in the buffer (2) 6 and the data reading operation from the buffer (2) 6. A lower axis represents time. It is assumed that Sscan is equal to double of Smem.

The reading sensor (1) 3-1 and the reading sensor (2) 3-2 start reading the image information (analog data) on the front side and backside of the original simultaneously at time T0. At time T1, the A/D conversion unit 4 converts the image information (analog data) from the reading sensor (1) 3-1 and the reading sensor (2) 3-2 to digital data, and stores the digital data to the buffer (1) 5 and the buffer (2) 6. There is a time lag from the start of reading by the reading sensor (1) 3-1 and the reading sensor (2) 3-2 to the start of storing in the buffer (1) 5 and the buffer (2) 6.

At time T2, the reading-per-block unit 8-2 of the data reading unit 8 starts reading the image information (digital data) stored in the buffer (1) 5 from a front address of Block Al and sending the image information to the external device 12 through the interface unit 1. In the process, the data reading unit 8 reads and sends the image information through one single communication line. Accordingly, it is not possible to send the image information (digital data) stored in the buffer (2) 6 to the external device 12 at the same time.

At time T3, the reading-per-block unit 8-2 completes reading the image information of Block Al in the buffer (1) 5, and sending the image information to the external device 12. At time T4 the reading-per-block unit 8-2 of the data reading unit 8 starts reading the image information (digital data) stored in the buffer (2) 6 from a front address of Block B1 and sending the image information to the external device 12 through the interface unit 1. Note that there is a time lag between T3 and T4 for setting an address of the image information to be read. At time T5, the A/D conversion unit 4 completes storing the image information (digital data) to the buffer (1) 5 and the buffer (2) 6 (Blocks A1, A2, B1, and B2; Sscan is assumed to be equal to double of Smem).

At time T6, the image information Block Al is already sent, so that the area of Block Al is empty. Accordingly, the A/D conversion unit 4 converts the image information (analog data) from the reading sensor (1) 3-1 to digital data, and stores the digital data in the empty area in the buffer (1) 5. At time T7, the reading-per-block unit 8-2 completes reading the image information of Block B1 in the buffer (2) 6 and sending the same to the external device 12.

At time T8, the reading-per-block unit 8-2 starts reading the image information (digital data) stored in the buffer (1) 5 from a front address of Block A2 and sending the image information to the external device 12 through the interface unit 1. Note that there is a time lag between T7 and T8 for setting an address of the image information to be read. At this time, the image information of Block B1 of the buffer (2) 6 is already sent, so that the area of Block B1 is empty. Accordingly, the A/D conversion unit 4 converts the image information (analog data) of Block B3 from the reading sensor (1) 3-1 to digital data, and stores the digital data in the empty area in the buffer (2) 6. At time T7, the reading-per-block unit 8-2 completes reading the image information of Block B1 in the buffer (2) 6 and sending the same to the external device 12.

At time T9, the A/D conversion unit 4 completes storing the image information (digital data) to the block A3 in the buffer (1) 5. At time T10, the reading-per-block unit 8-2 completes reading the image information of Block A2 in the buffer (1) 5 and sending the same to the external device 12. At this time, the A/D conversion unit 4 completes storing the image information (digital data) of Block B3 in the buffer (2) 6. At this time, the image information of Block A2 of the buffer (1) 5 is already sent, so that the area of Block A2 is empty. Accordingly, the A/D conversion unit 4 converts the image information (analog data) of Block A4 from the reading sensor (1) 3-1 to digital data, and stores the digital data in the empty area in the buffer (1) 5. At this time, the reading-per-block unit 8-2 starts reading the image information from the front address of Block B2 in the buffer (2) 6 and sending the same to the external device 12. Note that there is a time lag between T10 and T11 for setting an address of the image information to be read.

At time T12, the A/D conversion unit 4 completes storing the image information (digital data) of Block A4 in the buffer (1) 5. At this time, the reading-per-block unit 8-2 completes reading the image information of Block B2 in the buffer (2) 6 and sending the same to the external device 12.

At time T13, the reading-per-block unit 8-2 starts reading the image information of Block A3 stored in the buffer (1) 5 from the front address and sending the image information to the external device 12 through the interface unit 1. Note that there is a time lag between T12 and T13 for setting an address of the image information to be read. At this time, the image information of Block B3 in the buffer (2) 6 is already sent, so that the area of Block B3 is empty. Accordingly, the A/D conversion unit 4 converts the image information (analog data) of Block B4 from the reading sensor (1) 3-1 to digital data, and stores the digital data in the empty area in the buffer (2) 6.

At time T14, the reading sensor (1) 3-1 and the reading sensor (2) 3-2 complete reading the image information (analog data) on the front side and backside of the original simultaneously at time T0. At time T15, the reading-per-block unit 8-2 completes reading the image information of Block A3 in the buffer (1) 5, and sending the image information to the external device 12. At this time, the A/D conversion unit 4 completes storing the image information (digital data) of Block B4 in the buffer (2) 6.

Similarly, the reading-per-block unit 8-2 alternately reads the image information (digital data) of Block B3, Block A4, and Block B4 in the buffer (1) 5 and the buffer (2) 6, and sending the image information to the external device 12.

As described above, in the reading-per-block mode, the reading-per-block unit 8-2 alternately reads the image information (digital data) per block. Accordingly, every time the image information of one block is completely sent, the buffer (1) 5 or the buffer (2) 6 has the empty area. It is possible to store the next block in the empty area, thereby making it possible to store and read the image information even in the case that Sscan is greater than Smem. Similar to the process shown in FIG. 2(B), the reading-per-block unit 8-2 alternately reads the image data per block. Accordingly, each time the block is switched, it is necessary to seek an address of an area where the block is retained. As a result, it takes long time (time lag) to re-set the reading address, thereby increasing the whole process time.

As shown in FIG. 1, the control unit 9 controls a motor 9-1, a sheet sensor (1) 9-2, and a sheet sensor (2) 9-3 disposed in the image reading apparatus 100 in addition to a whole mechanical unit of the apparatus. The CPU 11 executes a specific program stored in the ROM 10-1 to start the control unit 9. The system memory 10 includes the ROM 10-1 for storing programs and control data necessary for controlling the image reading apparatus 100, and an RAM 10-2 having a working area for a computation process. In the embodiment, the ROM 10-1 stores in advance programs for starting the reading condition receiving unit 2, the image reading unit 3, the A/D conversion unit 4, the reading mode selection unit 7, the data reading unit 8, and the control unit 9, when the CPU 11 execute the programs. Further, the buffer (1) 5 and the buffer (2) 6 may be disposed in an area of the RAM 10-2.

The CPU 11 includes a microprocessor for controlling the image reading apparatus 100 with the system memory 10. In the embodiment, the CPU 11 executes the programs stored in the ROM 10-1 to start the reading condition receiving unit 2, the image reading unit 3, the A/D conversion unit 4, the reading mode selection unit 7, the data reading unit 8, and the control unit 9.

Figure 3:
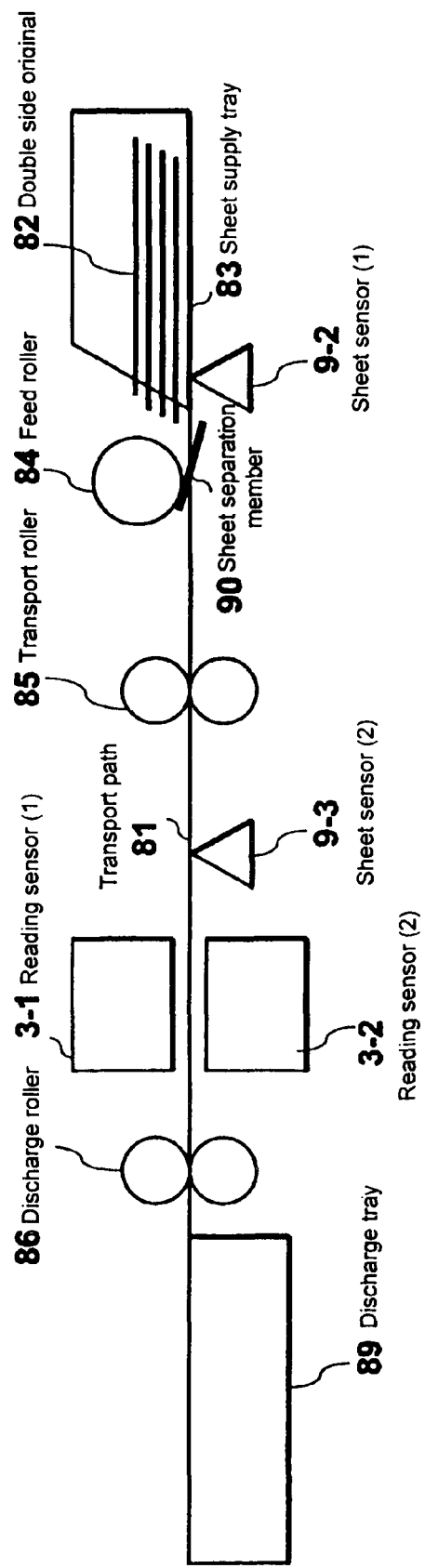
FIG. 3 is a schematic view showing a scanner unit according to the first embodiment of the present invention.

A main configuration near the reading sensors of the image reading apparatus 100 will be explained next. FIG. 3 is a schematic view showing a scanner unit according to the first embodiment of the present invention. A double side original 82 is transported on a transport path 81 from a sheet supply tray 83, and is discharged to a discharge tray 89 through the sheet sensor (1) 9-2, a feed roller 84, a sheet separation member 90, a transport roller 85, the sheet sensor (2) 9-3, the reading sensor (1) 3-1, the reading sensor (2) 3-2, and a discharge roller 86. When the double side original 82 is placed on the sheet tray 83, the motor 9-1 turns on. When no original is placed on the sheet tray 83, the motor 9-1 turns off. A signal of the motor 9-1 is sent to the control unit 9 (FIG. 1).

When the double side original 82 is transported on the transport path 81 to a specific position close to the reading sensor (1) 3-1, the sheet sensor (2) 9-3 turns on, and turns off on at any other occasions. A signal of the sheet sensor (2) 9-3 is sent to the control unit 9.

The reading sensor (1) 3-1 reads the front side of the double side original 82, and the reading sensor (2) 3-2 reads the backside thereof. The image information created by the reading sensor (1) 3-1 and the reading sensor (2) 3-2 is sent to the A/D conversion unit 4 as analog data.

An operation of the image reading apparatus 100 will be explained next. The operation includes an operation of reading and converting the image information (analog data) from the double side original, and storing the image information in the buffer; and an operation of reading the image information (digital data) from the buffer.

Figure 4:
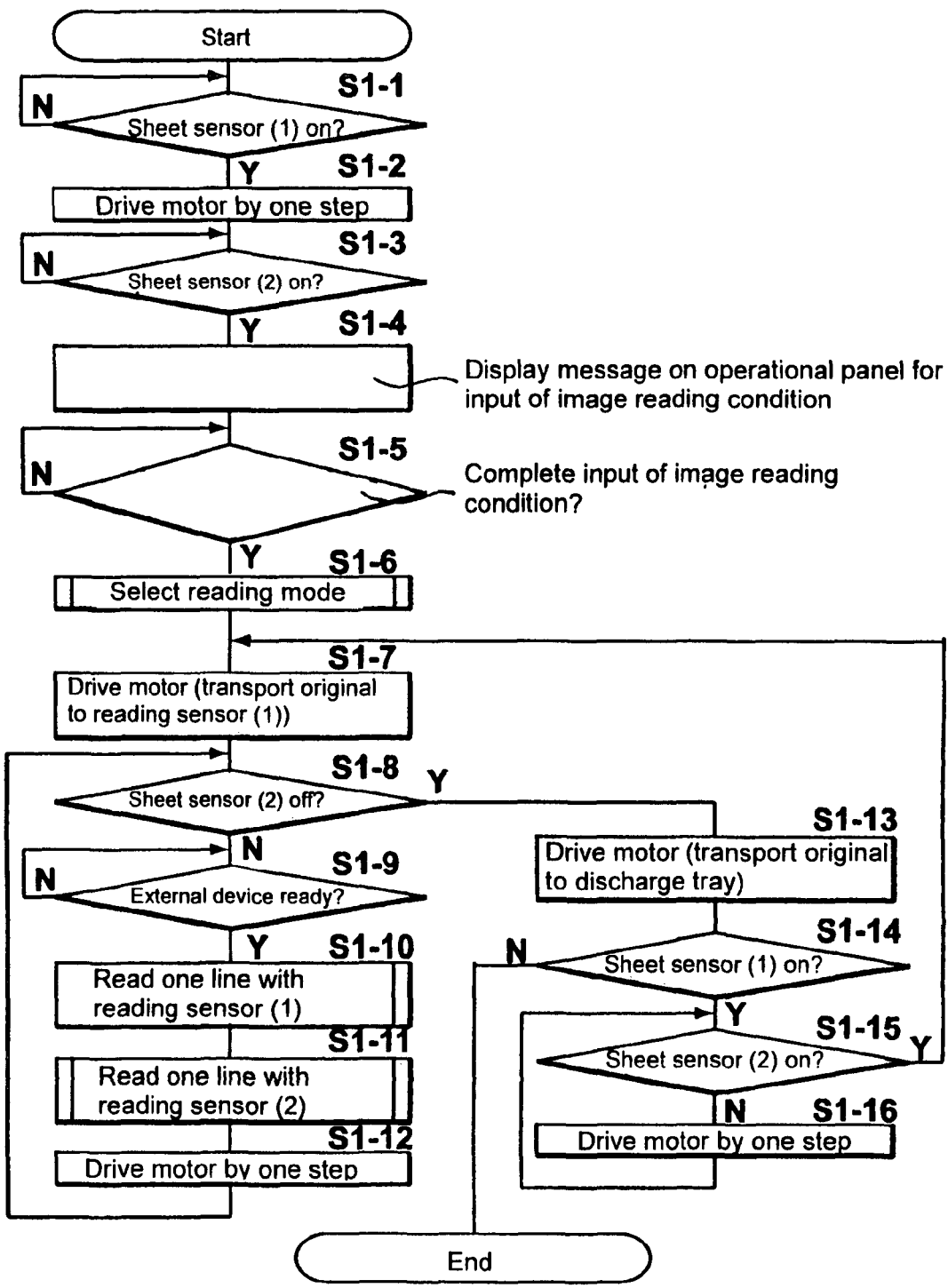
FIG. 4 is a flow chart showing a reading operation of the image reading apparatus according to the first embodiment of the present invention.

FIG. 4 is a flow chart showing the reading operation of the image reading apparatus according to the first embodiment of the present invention. The flow chart covers an operation from a step in which the image reading apparatus 100 receives the double side original and the image reading unit reads the image information (analog data) to a step in which the A/D conversion unit converts the image information to the digital data and the image information is stored in the buffer.

Figure 5:
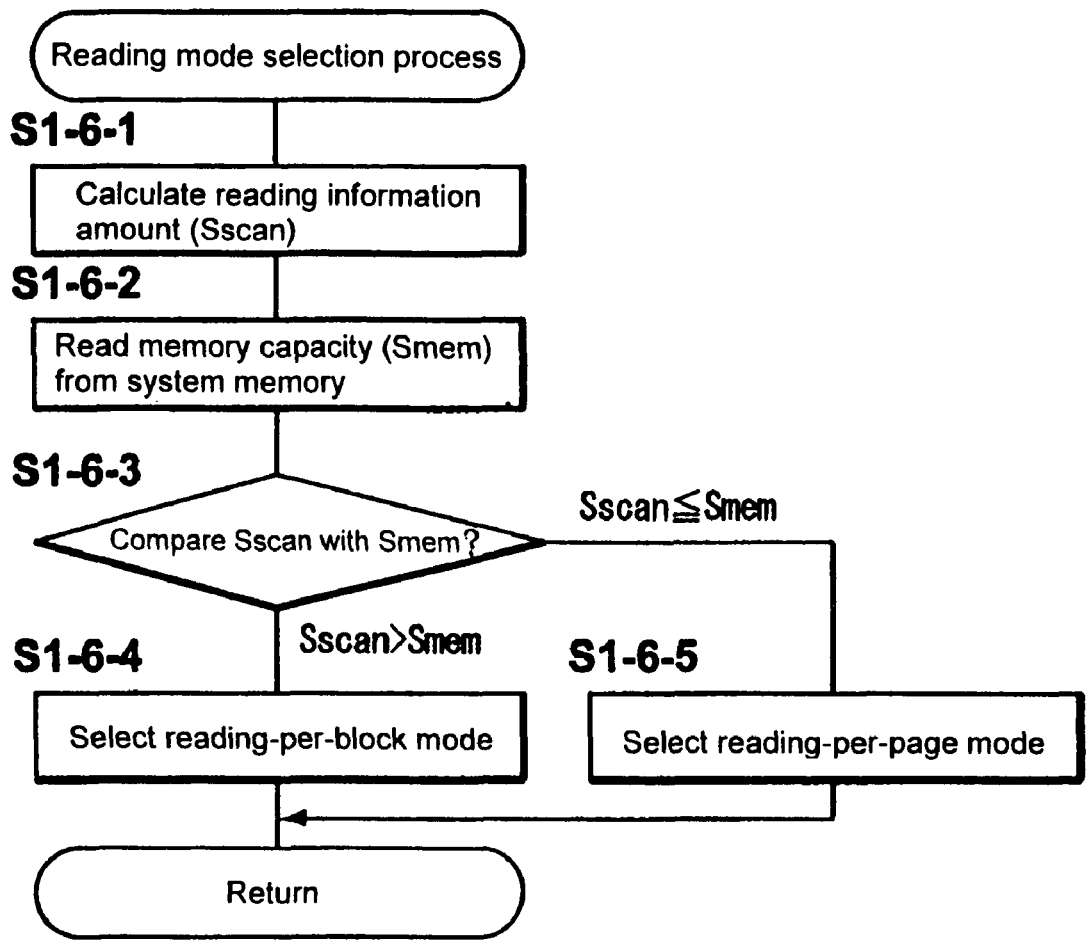
FIG. 5 is a flow chart showing a process of selecting the reading mode according to the first embodiment of the present invention.
Figure 6:
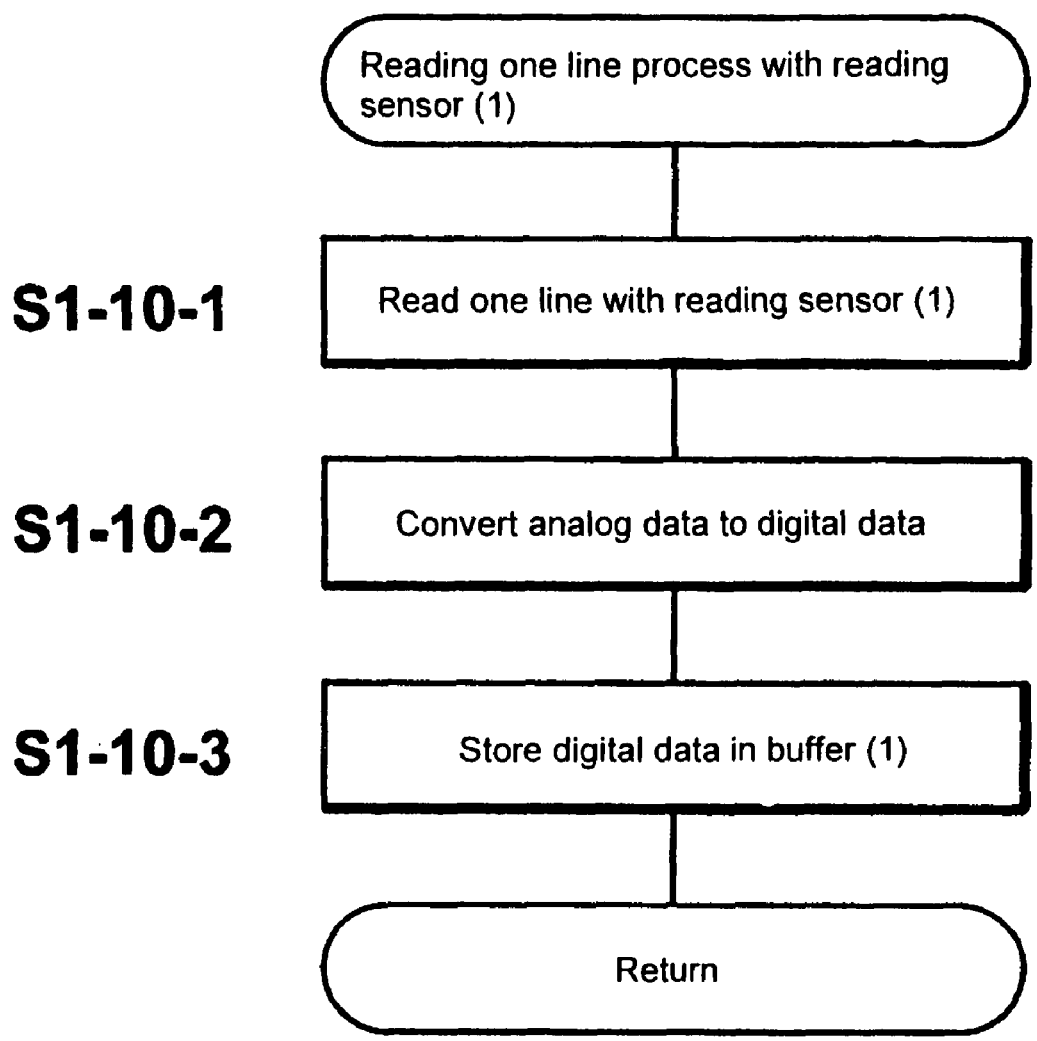
FIG. 6 is a flow chart view showing an operation (No. 1) of reading and storing according to the first embodiment of the present invention.
Figure 7:
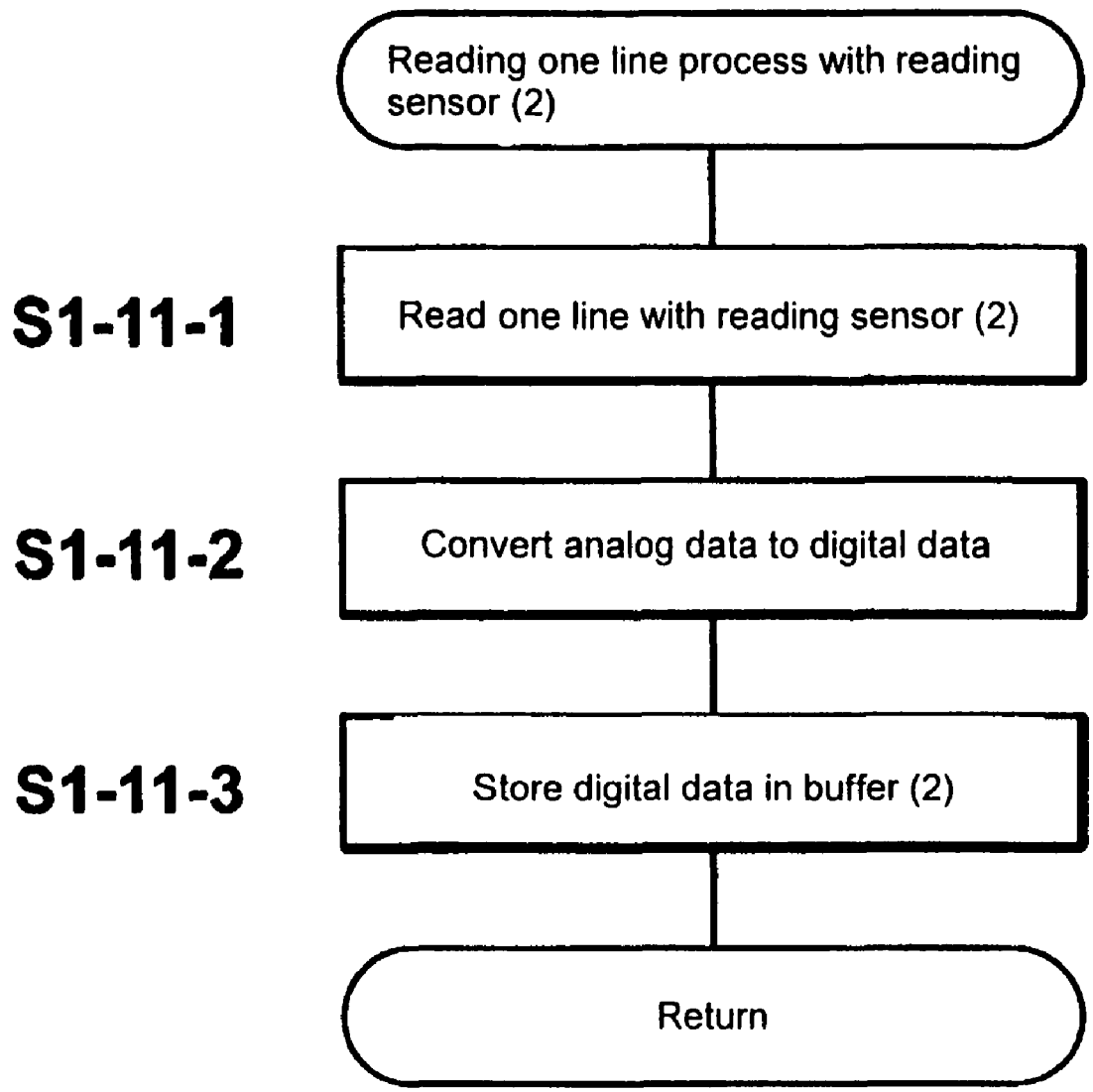
FIG. 7 is a flow chart view showing an operation (No. 2) of reading and storing according to the first embodiment of the present invention.

FIG. 5 is a flow chart showing a process of selecting the reading mode according to the first embodiment of the present invention. The flow chart shows a detailed process of step S1-6 in FIG. 4. FIG. 6 is a flow chart view showing an operation (No. 1) of reading and storing according to the first embodiment of the present invention. The flow chart shows a detailed process of step S1-10 in FIG. 4. FIG. 7 is a flow chart view showing an operation (No. 2) of reading and storing according to the first embodiment of the present invention. The flow chart shows a detailed process of step S1-11 in FIG. 4.

In step S1-1, the sheet sensor (1) 9-2 (FIG. 3) waits for the operator to place the double side original 82 (FIG. 3) on the sheet supply tray 83 (FIG. 3), and turns on when the double side original 82 is placed on the sheet supply tray 82, thereby sending an on-signal to the control unit 9. Then, the process proceeds to step S1-2.

In step S1-2, the control unit 9 drives the motor 9-1 (FIG. 1) by one step to transport the double side original 82 toward the reading sensor (1) 3-1 and the reading sensor (2) 3-2. In step S1-3, the sheet sensor (2) 9-3 (FIG. 3) waits for the double side original 82, and turns on when the double side original 82 arrives, thereby sending an on-signal to the control unit 9. The process proceeds to step S1-2. Steps S1-2 and S1-3 are repeated until the double side original 82 is detected.

In step S1-4, when the reading condition receiving unit 2 receives a signal from the control unit 9 that the double side original 82 is detected, the reading condition receiving unit 2 displays a message on the operational panel 2-1 (FIG. 1) for prompting the operator to input an image reading condition. In step S1-5, the reading condition receiving unit 2 waits for an input of the image reading condition by the operator. When all image reading conditions are input, the process proceeds to step S1-6.

Step S1-6 from step S1-6-1 to step S1-6-5 will be explained in detail with reference to FIG. 5. In step S1-6-1, the image information amount calculation unit 7-1 of the reading mode selection unit 7 calculates the reading information amount (Sscan) according to the image reading condition received at the reading condition receiving unit 2. For example, when the operator selects an original size of A3 (297 mm×420 mm), reading resolution of 300 dpi, color scale of 24 bit, the image information amount calculation unit 7-1 calculates the reading information amount (Sscan) according to the following equation.

$$Sscan=(297/25.4)\times(420/25.4)\times300\times 24 \approx 417.6 Mbit \approx 52.2 MByte$$

In steps S6-1-2, the reading mode selection unit 7-2 of the reading mode selection unit 7 reads the memory capacities (Smem) of the buffer (1) 5 and the buffer (2) 6 from the ROM 10-1. In this embodiment, the memory capacities (Smem) are assumed to be 64 Mbyte. In step S6-1-3, the reading mode selection unit 7-2 compares the reading information amount (Sscan) with the memory capacities (Smem). When the reading information amount (Sscan) is greater than the memory capacities (Smem), the process proceeds to step S6-1-4. When the reading information amount (Sscan) is equal to or smaller than the memory capacities (Smem), the process proceeds to step S6-1-5.

In step S6-1-4, the reading mode selection unit 7 selects the reading-per-block mode, and the process returns to step S1-7 in FIG. 4. In step S6-1-5, the reading mode selection unit 7 selects the reading-per-page mode, and the process returns to step S1-7 in FIG. 4. In the example described above, the reading information amount (Sscan) is smaller than the memory capacities (Smem), so that the reading-per-page mode is selected.

In step S1-7, the control unit 9 drives the motor 9-1 to transport the double side original 82 to a position where the reading sensor (1) 3-1 and the reading sensor (2) 3-2 are disposed. In step S1-8, when the sheet sensor (2) 9-3 is on, the process proceeds to step S1-9. When the sheet sensor (2) 9-3 is off, the process proceeds to step S1-13. In step S1-9, the image reading unit 3 waits until the external device 12 starts up, and then the process proceeds to step S1-10 when the external device 12 starts up.

With reference to FIG. 6, step S1-10, i.e., from step S1-10-1 to step S1-10-3, will be explained in detail. In step S1-10-1, the image reading unit 3 controls the reading sensor (1) 3-1 to read one line of the image information (analog data) on the front side of the double side original 82. In step S1-10-2, the A/D conversion unit 4 controls the A/D conversion unit (1) 4-1 to convert the image information (analog data) to the digital data. In step S1-10-3, the A/D conversion unit 4 stores the image information (digital data) thus converted in the buffer (1) 5 at a specific address, and the process proceeds to step S1-11.

With reference to FIG. 7, step S1-11, i.e., from step S1-11-1 to step S1-11-3, will be explained in detail. In step S1-11-1, the image reading unit 3 controls the reading sensor (2) 3-2 to read one line of the image information (analog data) on the backside of the double side original 82. In step S1-11-2, the A/D conversion unit 4 controls the A/D conversion unit (1) 4-1 to convert the image information (analog data) to the digital data. In step S11-1-3, the A/D conversion unit 4 stores the image information (digital data) thus converted in the buffer (2) 6 at a specific address, and the process proceeds to step S1-12.

In step S1-12, the control unit 9 drives the motor 9-1 by one step, and the process returns to S1-8. Afterwards, step S1-8 to step S1-12 are repeated. When the sheet sensor (2) 9-3 turns off in step S1-8 (completion of reading of the double side original 82), the process proceeds to step S1-13. In step S1-13, the control unit 9 drives the motor 9-1 to transport the double side original 82 to the discharge tray 89. In step S1-14, when the sheet sensor (2) 9-3 is on (double side originals are still on the tray), the process proceeds to step S1-15. When the sheet sensor (2) 9-3 is off (no original is on the tray), the process stops. In step S1-15, when the sheet sensor (2) 9-3 is on, the process proceeds to step S1-7. When the sheet sensor (2) 9-3 is off, the process proceeds to step S1-16. In step S1-16, the control unit 9 drives the motor 9-1 by one step, and the process returns to S1-15. Step S1-15 and step S1-16 are repeated, so that the double side original 82 on the sheet supply tray 83 is separated from a bundle and transported to the sheet sensor (2) 9-3, then the process proceeds from step S1-15 to step S1-7.

Figure 8:
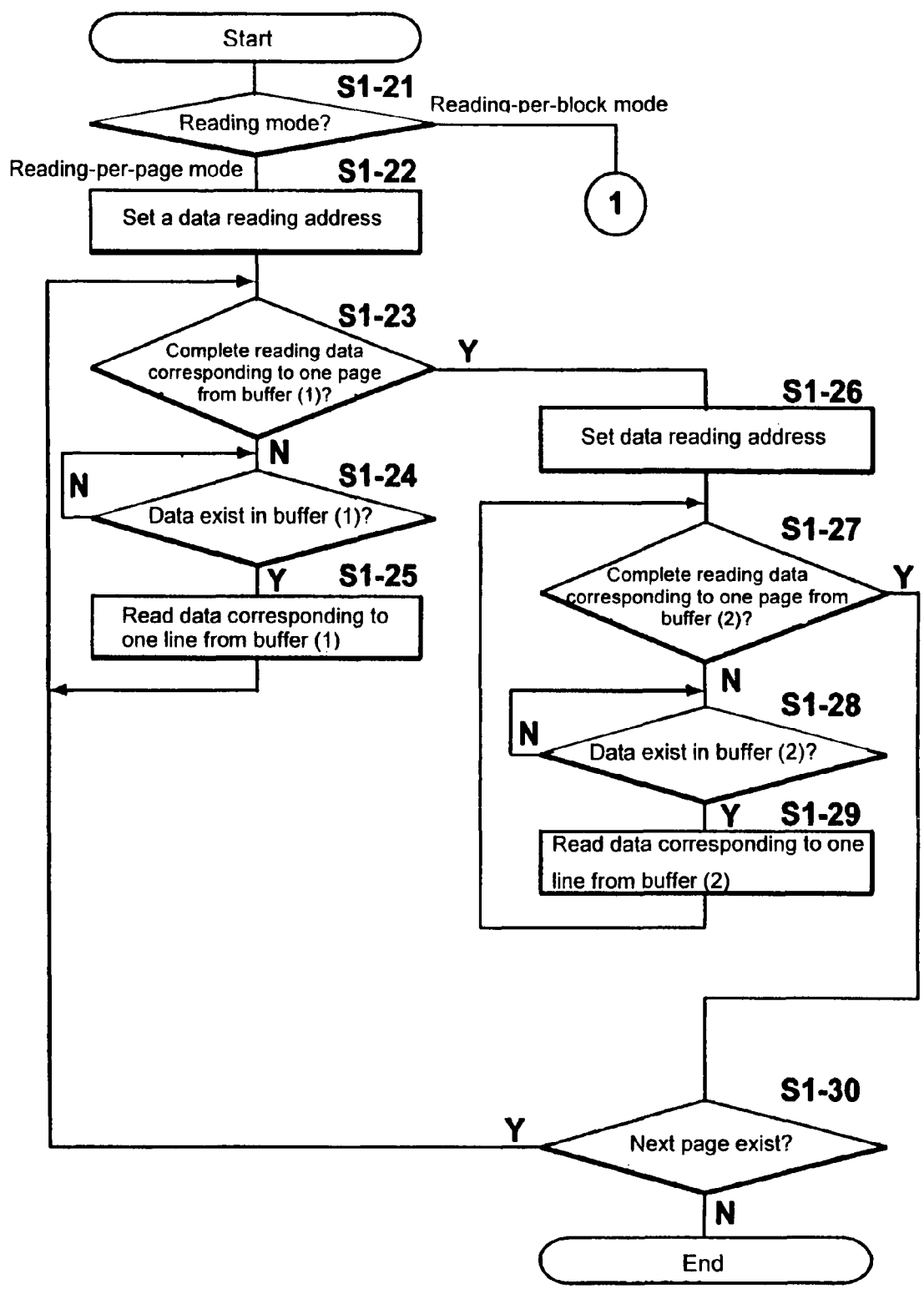
FIG. 8 is a flow chart view showing an operation (No. 1) of reading out data according to the first embodiment of the present invention.
Figure 9:
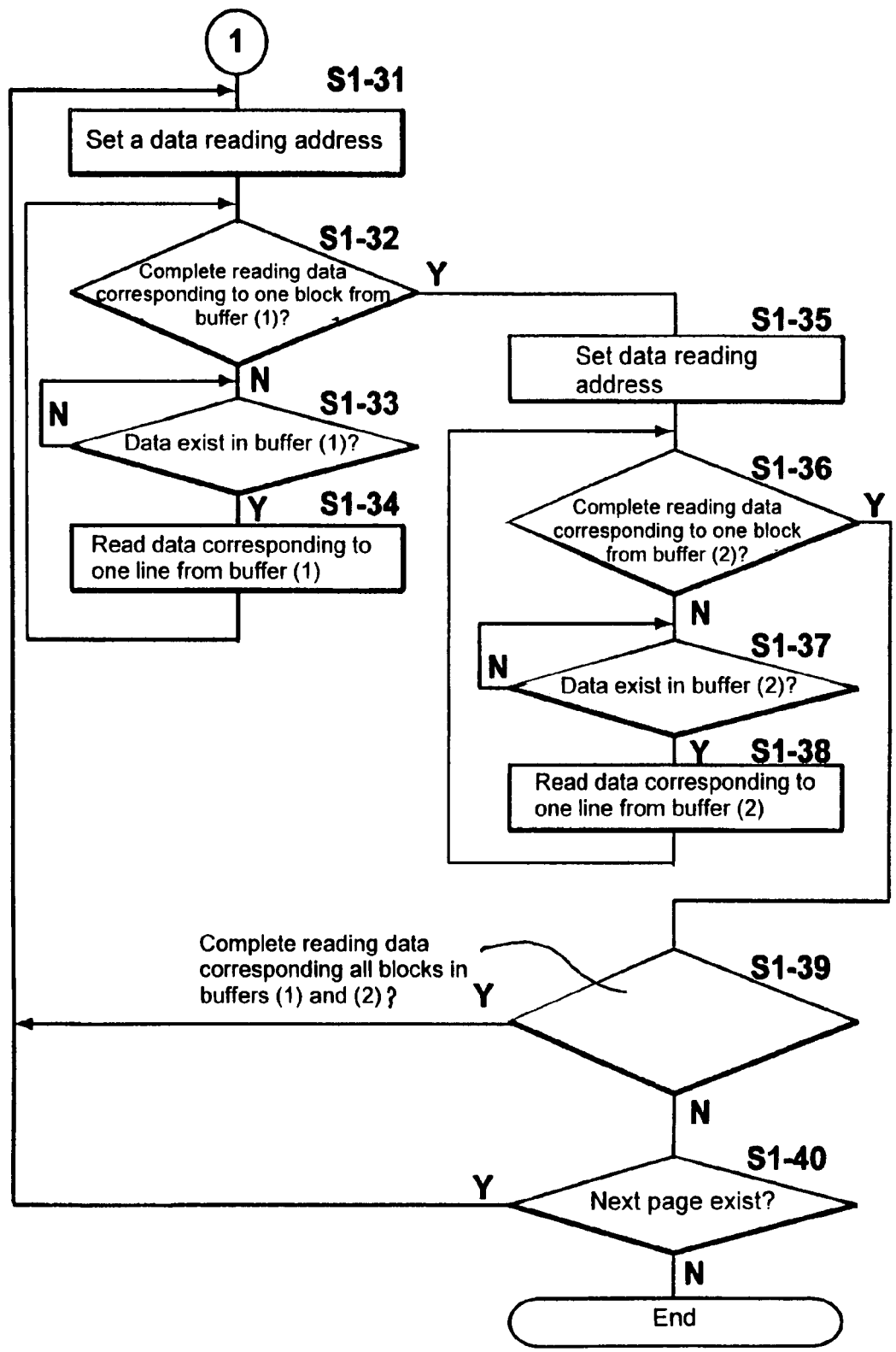
FIG. 9 is a flow chart view showing an operation (No. 2) of reading out data according to the first embodiment of the present invention.

An operation of reading the image information (digital data) from the buffers will be explained next. FIG. 8 is a flow chart view showing an operation (No. 1) of reading the image information (digital data) stored in the buffers in the reading-per-page mode according to the first embodiment of the present invention. FIG. 9 is a flow chart view showing an operation (No. 2) of reading the image information (digital data) stored in the buffers in the reading-per-block mode according to the first embodiment of the present invention.

In step S1-21, when the reading-per-page mode is selected in step S1-6 in FIG. 4, the process proceeds to step S1-22. When the reading-per-block mode is selected, the process proceeds to step S1-31. In step S1-22, the reading-per-page unit 8-1 of the data reading unit 8 sets a data reading address in the buffer (1) 5. In step S1-23, the reading-per-page unit 8-1 determines whether the image information corresponding to one page is read from the buffer (1) 5. When it is determined that the reading is completed, the process proceeds to step S1-26. When it is determined that the reading is not completed, the process proceeds to step S1-24.

In step S1-24, when the image information exists in the buffer (1) 5, the process proceeds to step S1-25. In step S1-25, the reading-per-page unit 8-1 reads the image information corresponding to one line from the buffer (1) 5, and sends the image information to the external device 12 through the interface unit 1, and then the process returns to step S1-23. Afterwards, step S1-23 to step S1-25 are repeated. After the image information corresponding to one page is read, the process jumps from step S1-23 to step S1-26.

In step S1-26, the reading-per-page unit 8-1 of the data reading unit 8 sets a data reading address in the buffer (2) 6. In step S1-27, the reading-per-page unit 8-1 determines whether the image information corresponding to one page is read from the buffer (2) 6. When it is determined that the reading is completed, the process proceeds to step S1-30. When it is determined that the reading is not completed, the process proceeds to step S1-28.

In step S1-28, when the image information exists in the buffer (2) 6, the process proceeds to step S1-29. In step S1-29, the reading-per-page unit 8-1 reads the image information corresponding to one line from the buffer (2) 6, and sends the image information to the external device 12 through the interface unit 1, and then the process returns to step S1-27. Afterwards, step S1-27 to step S1-29 are repeated. After the image information corresponding to one page is read, the process jumps from step S1-27 to step S1-30. In step S1-30, when the image information of a next page exists, the process returns to step S1-23. After step S1-23 to step S1-30 are repeated, when all of the image information is read, the process stops.

When the process proceeds from step S1-21 to step S1-31, in step S1-31, the reading-per-block unit 8-2 sets a data reading address in the buffer (1) 5. In step S1-32, the reading-per-block unit 8-2 determines whether the image information corresponding to one block is read from the buffer (1) 5. When it is determined that the reading is completed, the process proceeds to step S1-35. When it is determined that the reading is not completed, the process proceeds to step S1-33.

In step S1-33, when the image information exists in the buffer (1) 5, the process proceeds to step S1-34. In step S1-34, the reading-per-block unit 8-2 reads the image information corresponding to one line from the buffer (1) 5, and sends the image information to the external device 12 through the interface unit 1, and then the process returns to step S1-23. Afterwards, step S1-32 to step S1-34 are repeated. After the image information corresponding to one block is read, the process jumps from step S1-32 to step S1-35.

In step S1-35, the reading-per-block unit 8-2 sets a data reading address in the buffer (2) 6. In step S1-36, the reading-per-block unit 8-2 determines whether the image information corresponding to one block is read from the buffer (2) 6. When it is determined that the reading is completed, the process proceeds to step S1-39. When it is determined that the reading is not completed, the process proceeds to step S1-37.

In step S1-37, when the image information exists in the buffer (2) 6, the process proceeds to step S1-38. In step S1-38, the reading-per-block unit 8-2 reads the image information corresponding to one line from the buffer (2) 6, and sends the image information to the external device 12 through the interface unit 1, and then the process returns to step S1-36. Afterwards, step S1-36 to step S1-38 are repeated. After the image information corresponding to one block is read, the process jumps from step S1-36 to step S1-39. In step S1-39, when the image information of a next page exists, the process returns to step S1-31. After step S1-31 to step S1-39 are repeated, when all of the image information per block of the double side original is read, the process proceeds to step S1-40. In step S1-40, when a next double side original exists, the process returns to step S1-31, and step S1-31 to step S1-40 are repeated. When all of the image information is read, the process stops.

As described above, in the embodiment, the reading mode selection unit 7-2 compares the reading information amount (Sscan) with the memory capacities (Smem) of the buffers disposed in the apparatus according to the image reading conditions that the operator selects. When the reading information amount (Sscan) is greater than the memory capacities (Smem), the reading-per-page mode is selected, thereby reducing the data transmission time. When the reading information amount (Sscan) is equal to or smaller than the memory capacities (Smem), the reading-per-block mode is selected. Accordingly, while the data transmission time increases, it is possible to process with a small memory capacity. That is, the memory capacity is set according to the standard image quality. When the resolution exceeding the standard image quality is selected, the process is performed per block. Therefore, it is possible to maintain the image quality while reducing the data transmission time without a large capacity memory, thereby reducing cost.

In the embodiment, the CPU 11 executes a specific program stored in the ROM 10-1 to start the reading condition receiving unit 2; the image reading unit 3; the A/D conversion unit 4; the reading mode selection unit 7; the data reading unit 8; and the control unit 9 disposed as the computer control units. The present invention is not limited to the configuration, and all or a part of the units may be replaced with a specific electric circuit.

Second Embodiment

In the first embodiment, the data reading unit reads the image information from the buffer (1) 5 and the buffer (2) 6, and the image information is directly sent to the external device through the interface unit. In the second embodiment, after the data reading unit reads the image information from the buffer (1) 5 and the buffer (2) 6, the image information (digital data) is compressed according to algorithm and a compression parameter selected by an operator, and then sent to the external device through the interface unit.

Figure 10:
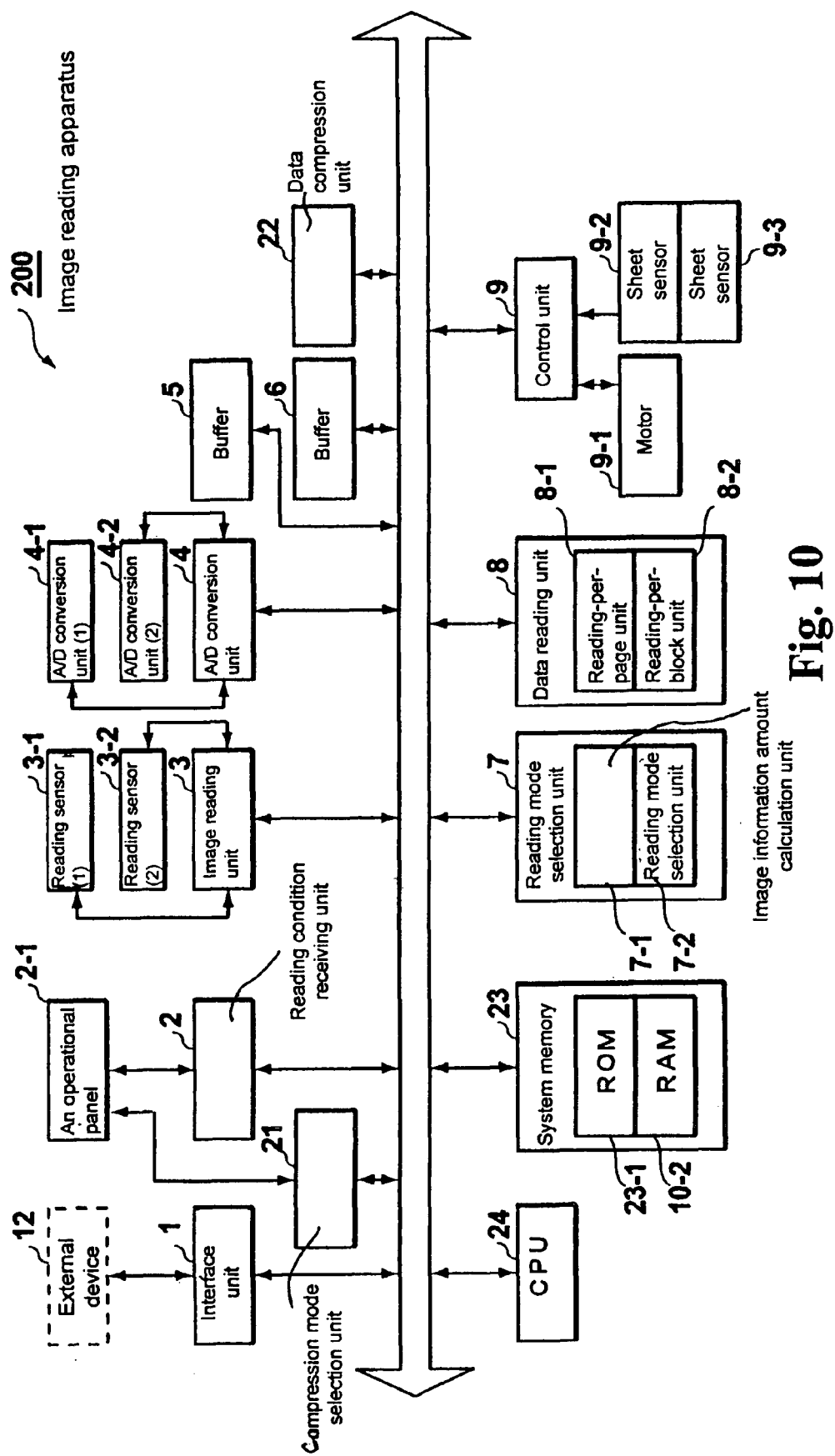
FIG. 10 is a schematic block diagram of an image reading apparatus according to a second embodiment of the present invention.

FIG. 10 is a schematic block diagram of an image reading apparatus 200 according to the second embodiment of the present invention. The image reading apparatus 200 includes the interface unit 1; the reading condition receiving unit 2; the image reading unit 3; the A/D conversion unit 4; the buffer 5;

the buffer 6; the reading mode selection unit 7; the data reading unit 8; the control unit 9; a compression mode selection unit 21; a data compression unit 22; a system memory 23; and a CPU 24. Only components different from those in the first embodiment will be explained, and components same as those in the first embodiment are designated by the same reference numerals.

The compression mode selection unit 21 displays a compression mode on the operation panel 2-1. The compression mode includes a format such as JPEG, JBIG and no compression, and a data compression rate such as low, middle and high. The compression mode selection unit 21 selects compression algorithm and a compression parameter according to an intention of the operator. The CPU 24 executes a specific program stored in the ROM 23-1 in advance to start the compression mode selection unit 21.

The data compression unit 22 compresses the image information read at the data reading unit 8, and sends the compressed data to the external device through the interface unit 1. The data compression unit 22 compresses the image information according to the algorithm and the compression parameter selected at the compression mode selection unit 21. The CPU 24 executes a specific program stored in the ROM 23-1 in advance to start the data compression unit 22.

The system memory 23 includes the ROM 23-1 for storing programs and control data necessary for controlling the image reading apparatus 200, and the RAM 10-2 having a working area for a computation process of the CPU 24. In the embodiment, the ROM 23-1 stores in advance programs for starting the reading condition receiving unit 2, the image reading unit 3, the A/D conversion unit 4, the reading mode selection unit 7, the data reading unit 8, the control unit 9, the compression mode selection unit 21, and the data compression unit 22 when the CPU 24 execute the programs stored in the ROM 23-1 in advance. Further, the buffer (1) 5 and the buffer (2) 6 may be disposed in an area of the RAM 10-2.

The CPU 24 includes a microprocessor for controlling the image reading apparatus 200 with the system memory 23. In the embodiment, the CPU 24 executes the programs stored in the ROM 23-1 to start the reading condition receiving unit 2, the image reading unit 3, the A/D conversion unit 4, the reading mode selection unit 7, the data reading unit 8, the control unit 9, the compression mode selection unit 21, and the data compression unit 22.

An operation of the image reading apparatus 200 will be explained next. The operation includes an operation of reading and converting the image information (analog data) from the double side original, and storing the image information in the buffers; and an operation of reading the image information (digital data) from the buffers.

Figure 11:
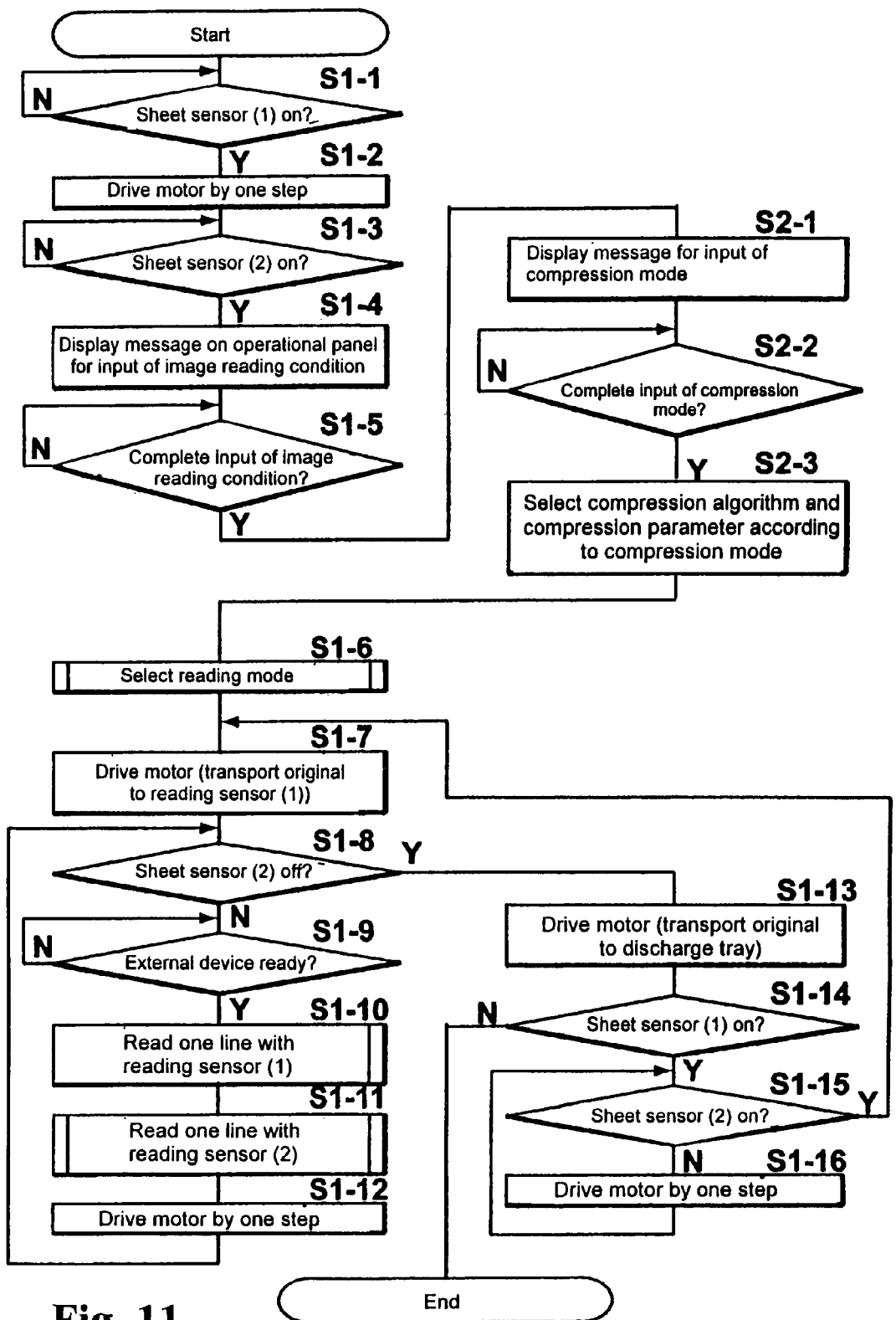
FIG. 11 is a flow chart view showing an operation of reading according to the second embodiment of the present invention.

FIG. 11 is a flow chart showing a reading operation of the image reading apparatus according to the second embodiment of the present invention. The flow chart covers an operation from a step in which the image reading apparatus 200 receives the double side original and the image reading unit reads the image information (analog data) to a step in which the A/D conversion unit converts the image information to the digital data and the image information is stored in the buffers. In the second embodiment, step S2-1 to step S2-3 are added between step S1-5 and step S1-6 shown in FIG. 4 in the first embodiment. Other steps are identical to those in the first embodiment. Accordingly, only step S2-1 to step S2-3 will be explained, and the other steps are designated with the same numbers in the first embodiment and explanations thereof are omitted.

In step S2-1, after the operator inputs all of the reading conditions in step S1-5, the compression mode selection unit 21 (FIG. 10) displays a message on the operation panel 2-1 (FIG. 10) prompting the operator to input the compression mode. The operator inputs the compression mode including a format such as JPEG, JBIG and no compression, and a data compression rate such as low, middle and high.

In steps S2-2, the compression mode selection unit 21 (FIG. 10) waits for the operator to input the compression mode, and the process proceeds to step S2-3 when all data are input. In step S2-3, the compression mode selection unit 21 selects algorithm and a compression parameter according to the compression mode selected by the operator, and the process proceeds to step S1-6.

Figure 12:
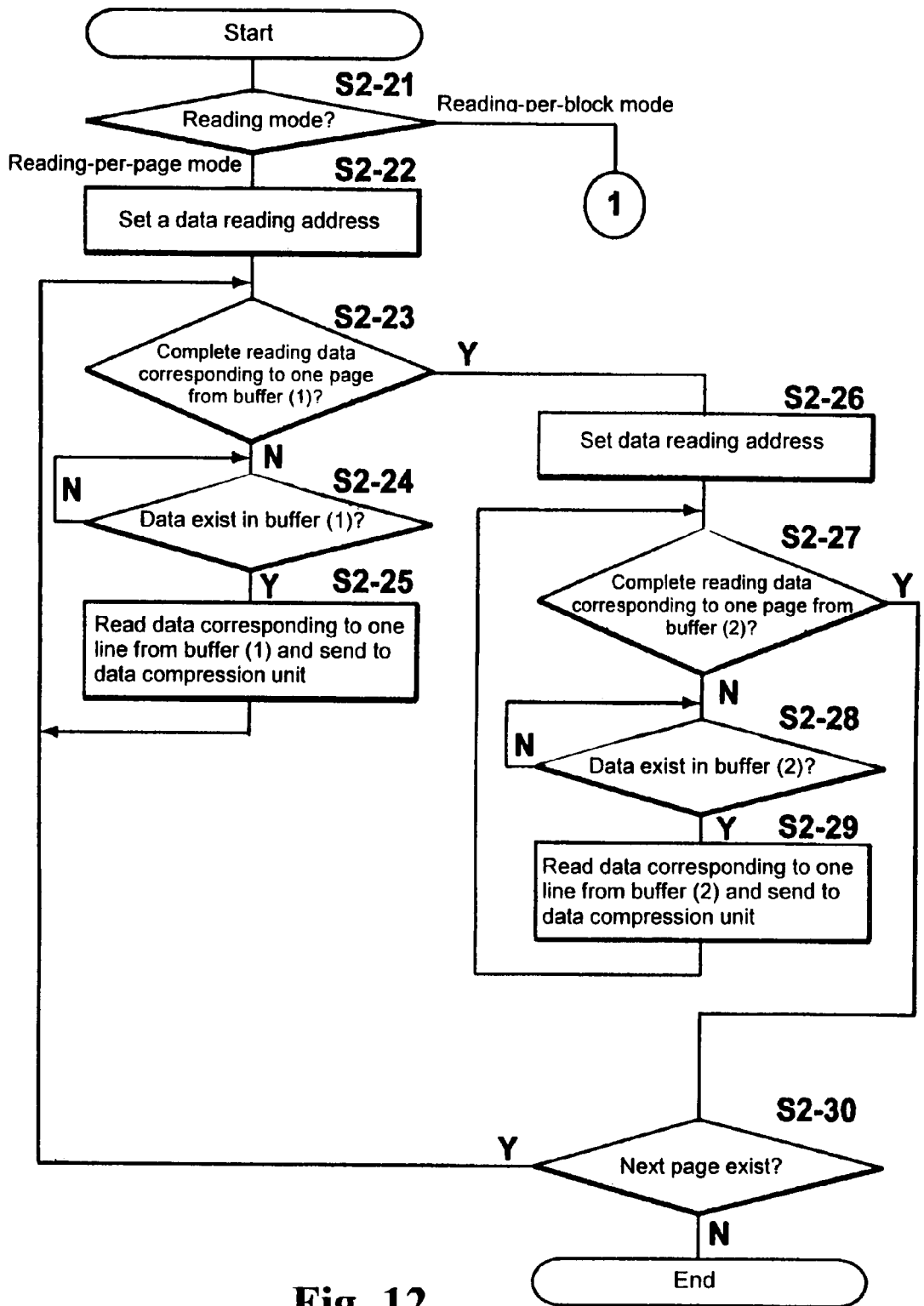
FIG. 12 is a flow chart view showing an operation (No. 1) of reading out data according to the second embodiment of the present invention.
Figure 13:
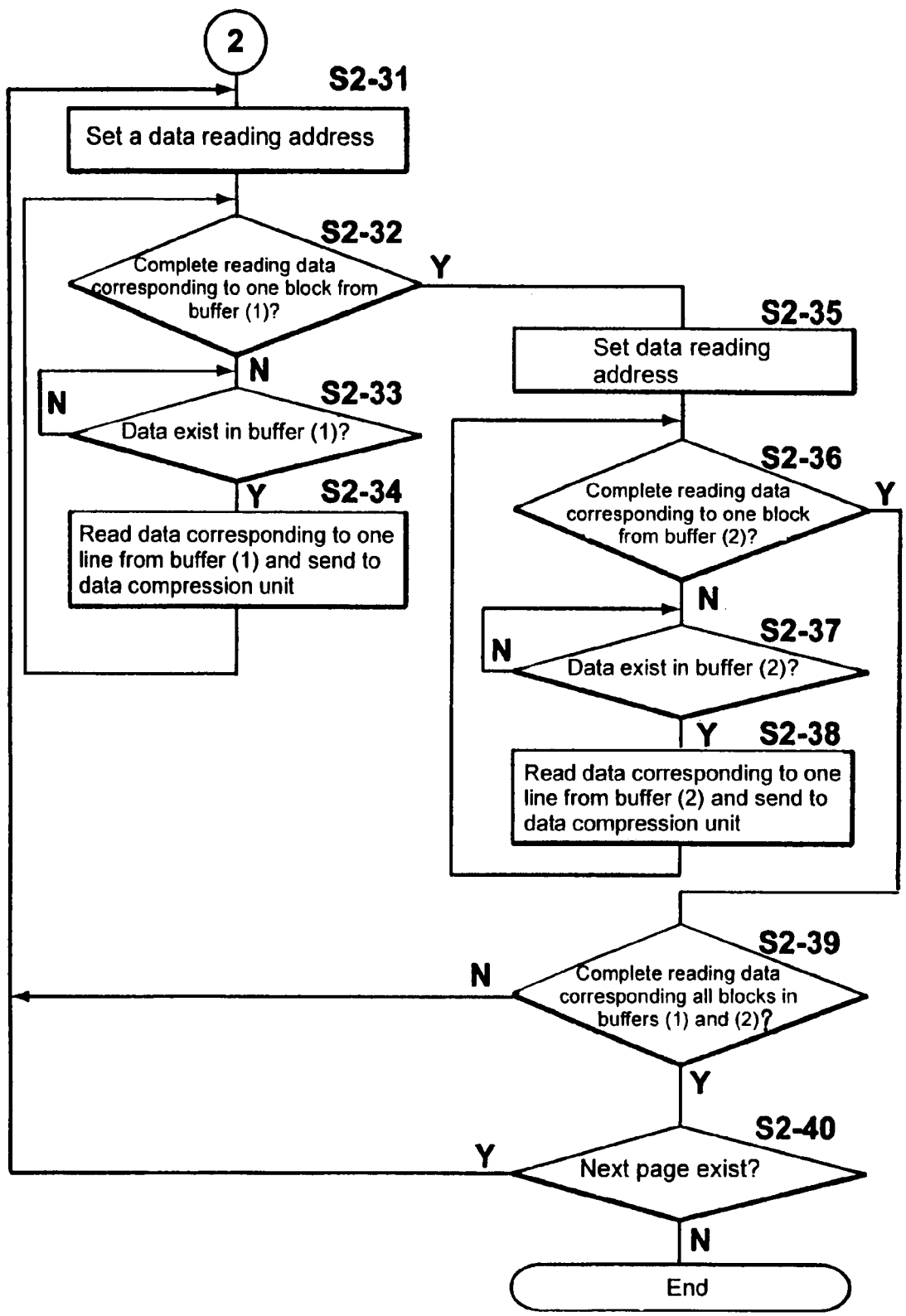
FIG. 13 is a flow chart view showing an operation (No. 2) of reading out data according to the second embodiment of the present invention.

An operation of reading the image information (digital data) from the buffers will be explained next. FIG. 12 is a flow chart view showing an operation (No. 1) of reading the image information (digital data) stored in the buffers in the reading-per-page mode according to the second embodiment of the present invention. The image information is compressed at the data compression unit with specific algorithm and a compression parameter, and sent to the external device. FIG. 13 is a flow chart view showing an operation (No. 2) of reading the image information (digital data) stored in the buffers in the reading-per-block mode according to the second embodiment of the present invention. The image information is compressed at the data compression unit with specific algorithm and a compression parameter, and the image information is sent to the external device.

In step S2-21, when the reading-per-page mode is selected in step S1-6 in FIG. 11, the process proceeds to step S2-22. When the reading-per-block mode is selected, the process proceeds to step S2-31. In step S2-22, the reading-per-page unit 8-1 of the data reading unit 8 sets a data reading address in the buffer (1) 5. In step S2-23, the reading-per-page unit 8-1 determines whether the image information corresponding to one page is read from the buffer (1) 5. When it is determined that the reading is completed, the process proceeds to step S2-26. When it is determined that the reading is not completed, the process proceeds to step S2-24.

In step S2-24, when the image information exists in the buffer (1) 5, the process proceeds to step S2-25. In step S2-25, the reading-per-page unit 8-1 reads the image information corresponding to one line from the buffer (1) 5, and sends the image information to the data compression unit 22. The data compression unit 22 compresses the image information corresponding to one line according to the algorithm and the compression parameter selected in step S2-3, and sends the compressed data to the external device 12 through the interface unit 1. Then, the process proceeds to step S2-23. Afterwards, step S2-23 to step S2-25 are repeated. After the image information corresponding to one page is read, the process jumps from step S2-23 to step S2-26.

In step S2-26, the reading-per-page unit 8-1 sets a data reading address in the buffer (2) 6. In step S2-27, the reading-per-page unit 8-1 determines whether the image information corresponding to one page is read from the buffer (2) 6. When it is determined that the reading is completed, the process proceeds to step S2-30. When it is determined that the reading is not completed, the process proceeds to step S2-28.

In step S2-28, when the image information exists in the buffer (2) 6, the process proceeds to step S2-29. In step S2-29, the reading-per-page unit 8-1 reads the image information corresponding to one line from the buffer (2) 6, and sends the image information to the data compression unit 22. The data compression unit 22 compresses the image information corresponding to one line according to the algorithm and the compression parameter selected in step S2-3, and sends the compressed data to the external device 12 through the interface unit 1. Then, the process proceeds to step S2-27. After step S2-27 to step S2-29 are repeated, when the image information corresponding to one page is read, the process jumps from step S2-27 to step S2-30.

When the process proceeds from step S2-21 to step S2-31, in step S2-31, the reading-per-block unit 8-2 sets a data reading address in the buffer (1) 5. In step S2-32, the reading-per-block unit 8-2 determines whether the image information corresponding to one block is read from the buffer (1) 5. When it is determined that the reading is completed, the process proceeds to step S2-35. When it is determined that the reading is not completed, the process proceeds to step S2-33.

In step S2-33, when the image information exists in the buffer (1) 5, the process proceeds to step S2-34. In step S2-34, the reading-per-block unit 8-2 reads the image information corresponding to one line from the buffer (1) 5, and sends the image information to the data compression unit 22. The data compression unit 22 compresses the image information corresponding to one line according to the algorithm and the compression parameter selected in step S2-3, and sends the compressed data to the external device 12 through the interface unit 1. Then, the process returns to step S2-32. Afterwards, step S2-32 to step S2-34 are repeated. After the image information corresponding to one block is read, the process proceeds to step S2-35.

In step S2-35, the reading-per-block unit 8-2 sets a data reading address in the buffer (2) 6. In step S2-36, the reading-per-block unit 8-2 determines whether the image information corresponding to one block is read from the buffer (2) 6. When it is determined that the reading is completed, the process proceeds to step S2-39. When it is determined that the reading is not completed, the process proceeds to step S2-37.

In step S2-37, when the image information exists in the buffer (2) 6, the process proceeds to step S2-38. In step S2-38, the reading-per-block unit 8-2 reads the image information corresponding to one line from the buffer (2) 6, and sends the image information to the data compression unit 22. The data compression unit 22 compresses the image information corresponding to one line according to the algorithm and the compression parameter selected in step S2-3, and sends the compressed data to the external device 12 through the interface unit 1. Then, the process returns to step S2-36. Afterwards, step S2-36 to step S2-38 are repeated. After the image information corresponding to one block is read, the process jumps from step S2-36 to step S2-39. In step S2-39, when the image information of a next page exists, the process returns to step S2-31. After step S2-31 to step S2-39 are repeated, when all of the image information per block of the double side original is read, the process proceeds to step S2-40. In step S2-40, when a next double side original exists, the process returns to step S2-31, and step S2-31 to step S2-40 are repeated. When all of the image information is read, the process stops.

As described above, in the second embodiment, with the compression mode selection unit 21 and the data compression unit 22, it is possible to transmit data to the external device quickly, in addition to the advantages of the first embodiment.

In the second embodiment, the CPU 24 executes a specific program stored in the ROM 23-1 to start the reading condition receiving unit 2; the image reading unit 3; the A/D conversion unit 4; the reading mode selection unit 7; the data reading unit 8; the control unit 9; the compression mode selection unit 21; and the data compression unit 22 disposed as the computer control units. The present invention is not limited to the configuration, and all or a part of the units may be replaced with a specific electric circuit.

Third Embodiment

In the second embodiment, the image information is compressed before being sent to the external device for reducing the transmission time. In the third embodiment, before being compressed, the image information is processed with image processing such as level correction based on an instruction of an operator.

Figure 14:
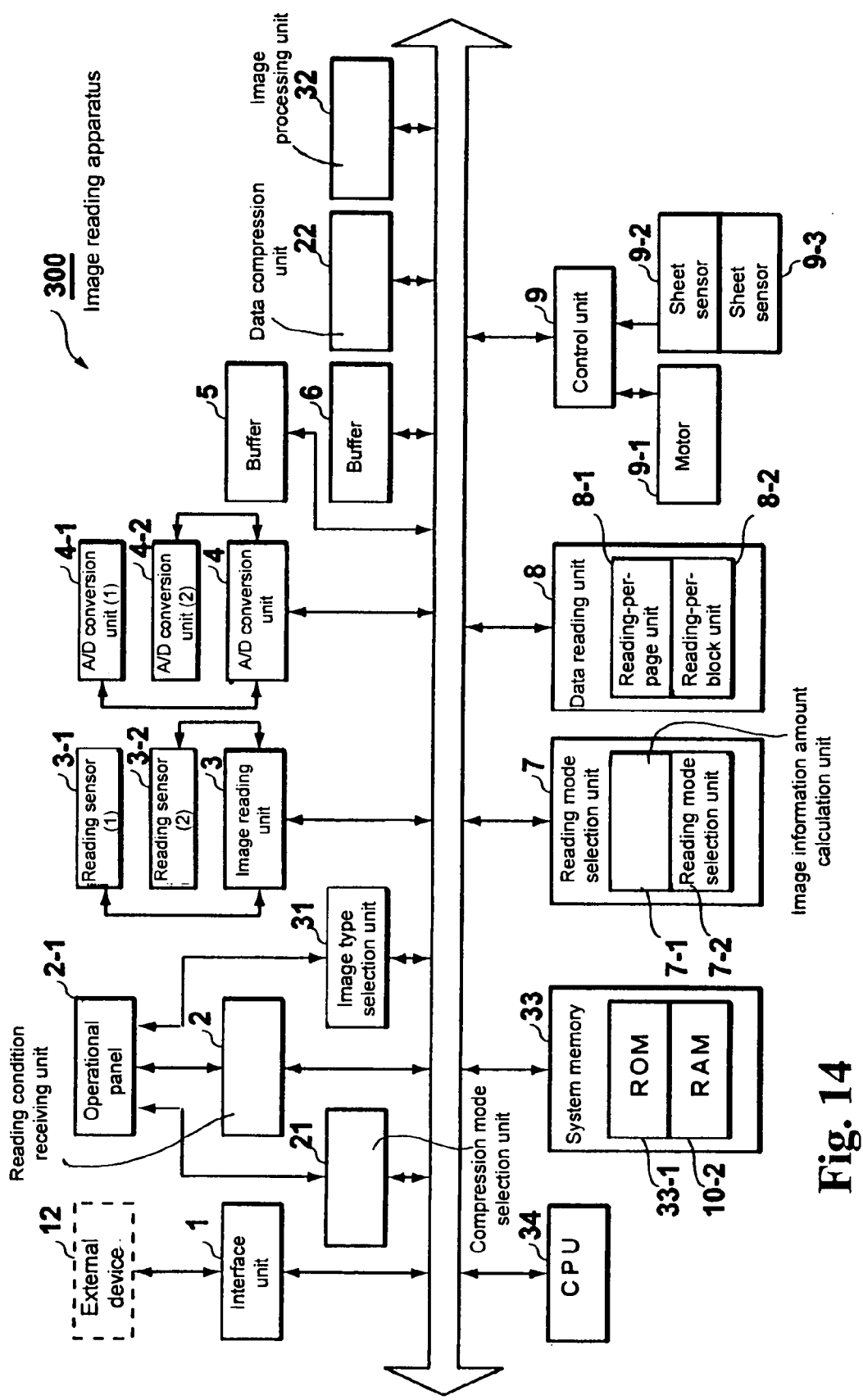
FIG. 14 is a schematic block diagram of an image reading apparatus according to a third embodiment of the present invention.

FIG. 14 is a schematic block diagram of an image reading apparatus 300 according to the third embodiment of the present invention. The image reading apparatus 300 includes the interface unit 1; the reading condition receiving unit 2; the image reading unit 3; the A/D conversion unit 4; the buffer 5; the buffer 6; the reading mode selection unit 7; the data reading unit 8; the control unit 9; the compression mode selection unit 21; the data compression unit 22; an image type selection unit 31; an image processing unit 32; a system memory 33; and a CPU 34. Only components different from those in the first and second embodiments will be explained. Components same as those in the first and second embodiments are designated by the same reference numerals, and explanations thereof are omitted.

The image type selection unit 31 displays an image type on the operation panel 2-1. The image type includes a photograph, a text, and a mixture of photograph and text. The image type selection unit 31 selects an image processing parameter according to an instruction of the operator. The CPU 34 executes a specific program stored in the ROM 33-1 in advance to start the image type selection unit 31.

The image processing unit 32 processes the image information read at the data reading unit 8, and sends the processed image to the data compression unit 22. The image processing unit 32 processes an image according to the image processing parameter selected at the image type selection unit 31. The CPU 34 executes a specific program stored in the ROM 33-1 in advance to start the image processing unit 32.

Figure 15A:
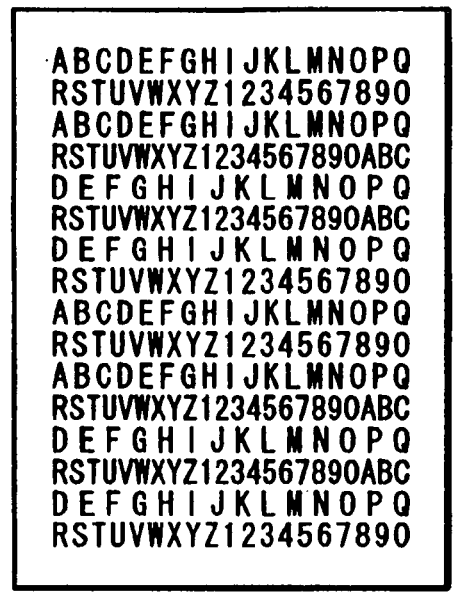
FIGS. 15(A) to 15(C) are views for explaining image processing (level correction)
Figure 15B:
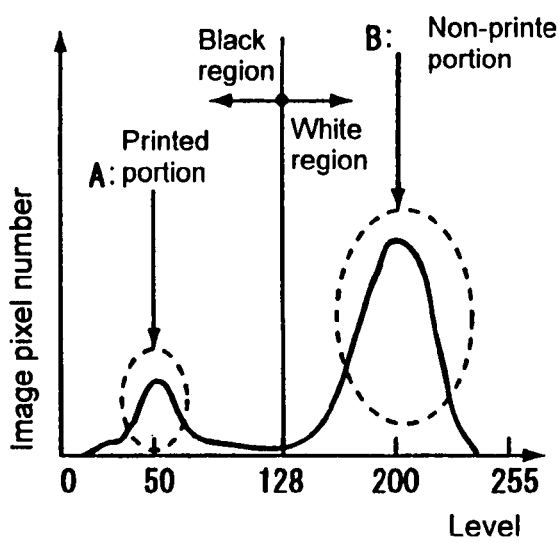
Figure 15C:
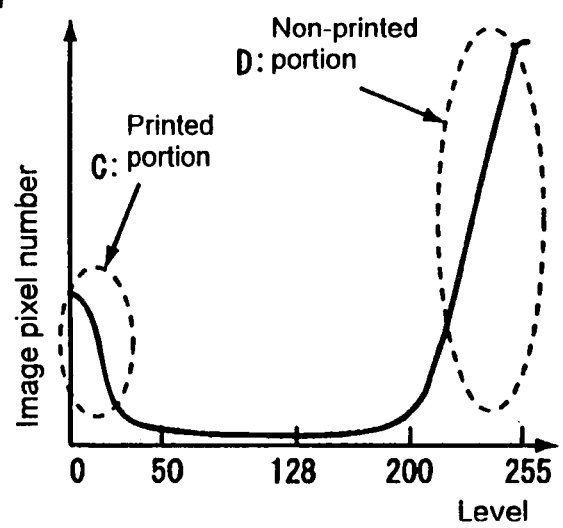

An example of the image processing will be explained next. FIGS. 15(A) to 15(C) are views for explaining the image processing (level correction). FIG. 15(A) is a view showing a text original. FIG. 15(B) is a view showing a histogram of image information (digital data) after the text original in FIG. 15(A) is read with 8 bit gray scale and converted to digital data. In FIG. 15(B), the horizontal axis represents image pixel level and the vertical axis represents image pixel number. FIG. 15(C) is a view showing a histogram after the level correction. In FIG. 15(C), the horizontal axis represents image pixel level and the vertical axis represents image pixel number. In FIGS. 15(B) and 15(C), an image is 100% black at level 0, and an image is 100% white at level 255.

As shown in FIG. 15(B), a printed portion (text portion) A is concentrated around level 50, and a non-printed portion (white portion) B is concentrated around level 200. The image pixel number is almost 0 at other level areas. In the level correction, the histogram curve in the black region is expanded such that a peak of the printed portion A (level 50) is shifted to level 0 with level 128 at the center. Also, the histogram curve in the white region is expanded such that a peak of the non-printed portion B (level 200) is shifted to level 255 with level 128 at the center. Further, an accumulated image pixel number smaller than the peak of the printed portion A (level 50) is added to the image pixel number of the peak of the printed portion A. Similarly, an accumulated image pixel number greater than the peak of the non-printed portion B (level 200) is added to the image pixel number of the peak of the non-printed portion B.

As a result of the level correction, the histogram shown in FIG. 15(CO is obtained. That is, the histogram in the range of level 0 to level 255 is confined in the range of level 50 to level 200, and upper and lower limits of the confined range are saturated, thereby obtaining the data in the range of level 0 to level 255. Accordingly, data in the mid range decreases, and data are concentrated at level 0 and level 255, thereby increasing efficiency of the data compression.

The system memory 33 includes the ROM 33-1 for storing programs and control data necessary for controlling the image reading apparatus 300, and the RAM 10-2 having a working area for a computation process of the CPU 34. In the embodiment, the ROM 33-1 stores in advance programs for starting the reading condition receiving unit 2, the image reading unit 3, the A/D conversion unit 4, the reading mode selection unit 7, the data reading unit 8, the control unit 9, the compression mode selection unit 21, the data compression unit 22, the image type selection unit 31, and the image processing unit 32 when the CPU 34 execute the programs stored in the ROM 33-1 in advance. Further, the buffer (1) 5 and the buffer (2) 6 may be disposed in an area of the RAM 10-2.

The CPU 34 includes a microprocessor for controlling the image reading apparatus 300 with the system memory 33. In the embodiment, the CPU 34 executes the programs stored in the ROM 23-1 to start the reading condition receiving unit 2, the image reading unit 3, the A/D conversion unit 4, the reading mode selection unit 7, the data reading unit 8, the control unit 9, the compression mode selection unit 21, the data compression unit 22, the image type selection unit 31, and the image processing unit 32.

An operation of the image reading apparatus 300 will be explained next. The operation includes an operation of reading and converting the image information (analog data) from the double side original, and storing the image information in the buffers; and an operation of reading the image information (digital data) from the buffers.

Figure 16:
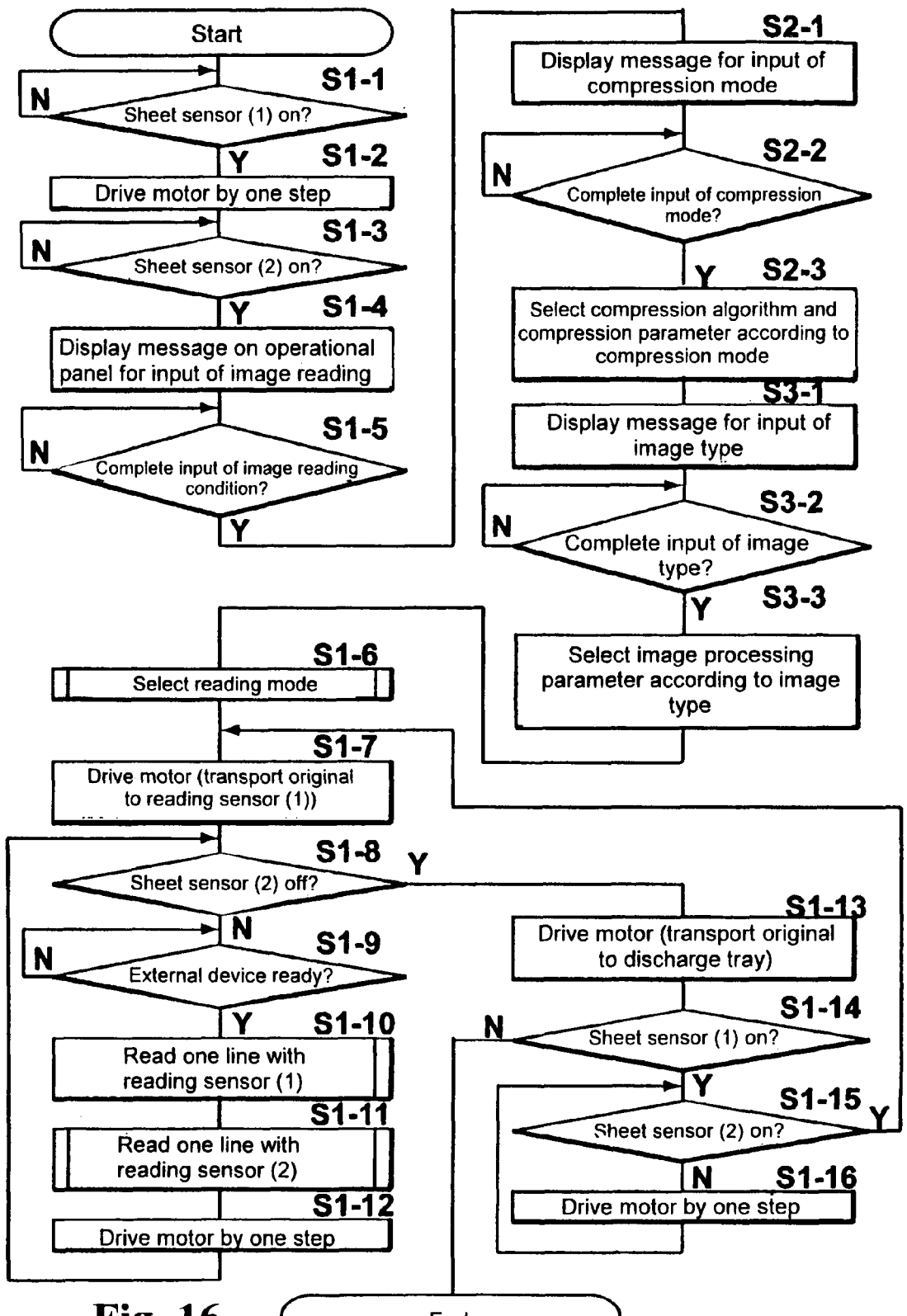
FIG. 16 is a flow chart view showing an operation of reading according to the third embodiment of the present invention.

FIG. 16 is a flow chart showing the reading operation of the image reading apparatus according to the third embodiment of the present invention. The flow chart covers an operation from a step in which the image reading apparatus 300 receives the double side original and the image reading unit reads the image information (analog data) to a step in which the A/D conversion unit converts the image information to the digital data and the image information is stored in the buffer. In the third embodiment, step S3-1 to step S3-3 are added between step S2-3 and step S1-6 shown in FIG. 11 in the second embodiment. Other steps are identical to those in the first embodiment (FIG. 4) and the second embodiment (FIG. 11). Accordingly, only step S3-1 to step S3-3 will be explained, and the other steps are designated with the same numbers in the first and second embodiments, and explanations thereof are omitted.

In step S3-1, after the operator inputs the compression mode in step S2-2, the image type selection unit 31 (FIG. 14) displays a message on the operation panel 2-1 (FIG. 14) for prompting the operator to input the image type. The operator inputs the image type such as a photograph, a text, a mixture of photograph and text.

In steps S3-2, the image type selection unit 31 (FIG. 14) waits for the operator to input the image type, and the process proceeds to step S3-3 when the image type is input. In step S3-3, the image type selection unit 31 selects the image processing parameter according to the image type selected by the operator, and the process proceeds to step S1-6.

Figure 17:
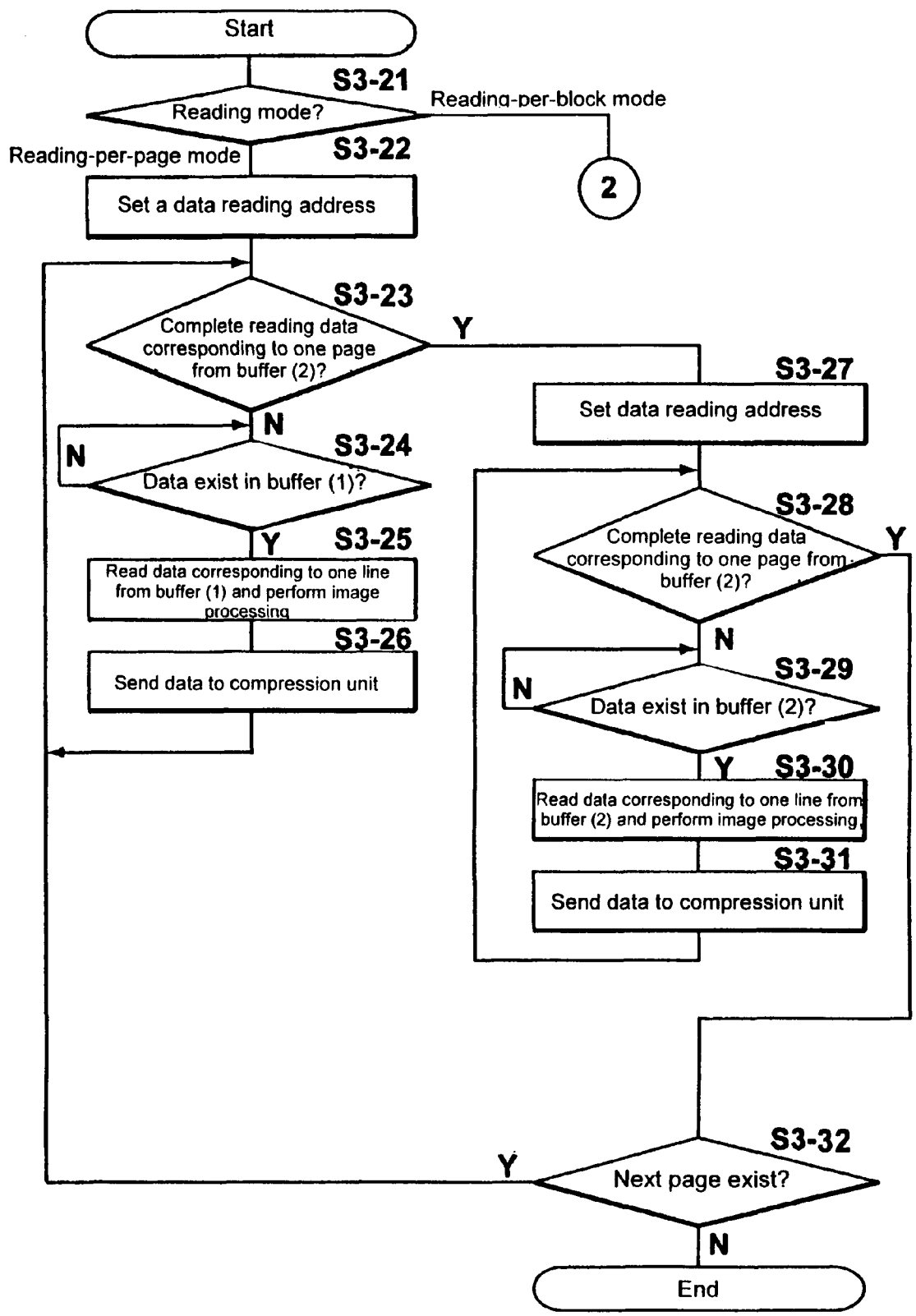
FIG. 17 is a flow chart view showing an operation (No. 1) of reading out data according to the third embodiment of the present invention.

An operation of reading the image information (digital data) from the buffers will be explained next. FIG. 17 is a flow chart view showing an operation (No. 1) of reading the image information (digital data) according to the third embodiment of the present invention. In the process, the data reading unit reads the image information (digital data) stored in the buffer (1) 5 and the buffer (2) 6 in the reading-per-page mode. The image processing unit performs the image processing (level correction). The image information is compressed at the data compression unit with specific algorithm and a compression parameter, and sent to the external device.

Figure 18:
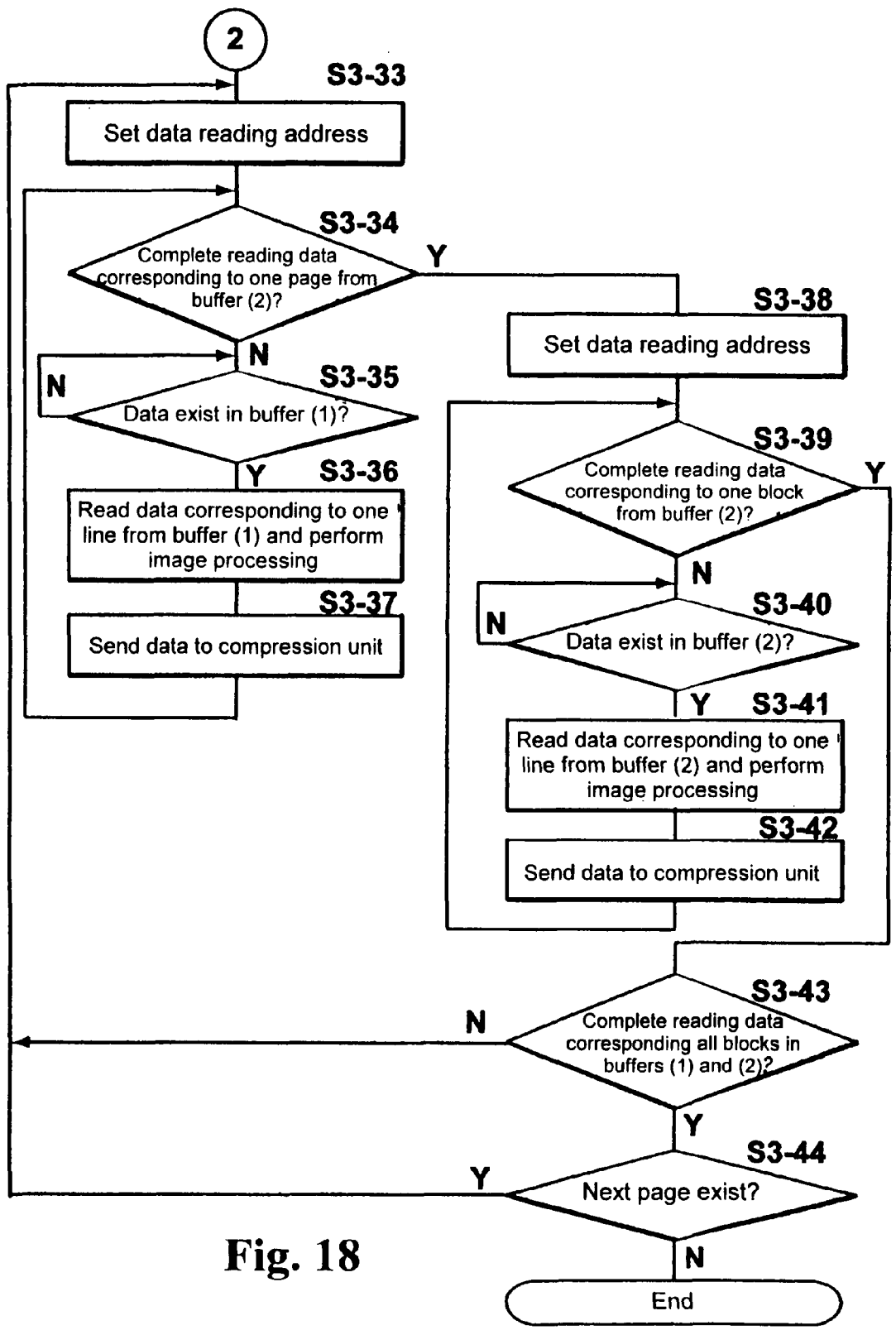
FIG. 18 is a flow chart view showing an operation (No. 2) of reading out data according to the third embodiment of the present invention.

FIG. 18 is a flow chart view showing an operation (No. 2) of reading the image information (digital data) according to the third embodiment of the present invention. In the process, the data reading unit reads the image information (digital data) stored in the buffer (1) 5 and the buffer (2) 6 in the reading-per-block mode. The image processing unit performs the image processing (level correction). The image information is compressed at the data compression unit with specific algorithm and a compression parameter, and sent to the external device.

In step S3-31, when the reading-per-page mode is selected in step S1-6 in FIG. 16, the process proceeds to step S3-22. When the reading-per-block mode is selected, the process proceeds to step S3-33. In step S3-22, the reading-per-page unit 8-1 of the data reading unit 8 sets a data reading address in the buffer (1) 5. In step S2-23, the reading-per-page unit 8-1 determines whether the image information corresponding to one page is read from the buffer (1) 5. When it is determined that the reading is completed, the process proceeds to step S3-27. When it is determined that the reading is not completed, the process proceeds to step S3-24.

In step S3-24, when the image information exists in the buffer (1) 5, the process proceeds to step S3-25. In step S3-25, the reading-per-page unit 8-1 reads the image information corresponding to one line from the buffer (1) 5, and sends the image information to the image processing unit 32. The image processing unit 32 performs the image processing on the image information corresponding to one line according to the image processing parameter selected at step S3-3. In step S3-26, the data compression unit 22 compresses the image information from the image processing unit 32 corresponding to one line according to the algorithm and the compression parameter selected in step S3-3, and sends the compressed data to the external device 12 through the interface unit 1. Then, the process proceeds to step S3-23. Afterwards, step S3-23 to step S3-26 are repeated. After the image information corresponding to one page is read, the process jumps from step S3-23 to step S3-27.

In step S3-27, the reading-per-page unit 8-1 sets a data reading address in the buffer (2) 6. In step S3-28, the reading-per-page unit 8-1 determines whether the image information corresponding to one page is read from the buffer (2) 6. When it is determined that the reading is completed, the process proceeds to step S3-32. When it is determined that the reading is not completed, the process proceeds to step S3-29.

In step S3-29, when the image information exists in the buffer (2) 6, the process proceeds to step S3-30. In step S3-30, the reading-per-page unit 8-1 reads the image information corresponding to one line from the buffer (2) 6, and sends the image information to the image processing unit 32. The image processing unit 32 performs the image processing on the image information corresponding to one line according to the image processing parameter selected at step S3-3. In step S3-31, the data compression unit 22 compresses the image information from the image processing unit 32 corresponding to one line according to the algorithm and the compression parameter selected in step S3-3, and sends the compressed data to the external device 12 through the interface unit 1. Then, the process proceeds to step S3-28. After step S3-28 to step S3-31 are repeated, when the image information corresponding to one page is read, the process jumps from step S3-28 to step S3-32.

In step S3-32, when the image information of a next page exists, the process returns to step S3-23. After step S3-23 to step S3-32 are repeated, when all of the image information is read and sent, the process stops.

When the process proceeds from step S3-21 to step S3-33, in step S3-33, the reading-per-block unit 8-2 sets a data reading address in the buffer (1) 5. In step S2-34, the reading-per-block unit 8-2 determines whether the image information corresponding to one block is read from the buffer (1) 5. When it is determined that the reading is completed, the process proceeds to step S3-38. When it is determined that the reading is not completed, the process proceeds to step S3-35.

In step S3-35, when the image information exists in the buffer (1) 5, the process proceeds to step S3-36. In step S2-36, the reading-per-block unit 8-2 reads the image information corresponding to one line from the buffer (1) 5, and sends the image information to the image processing unit 32. The image processing unit 32 performs the image processing on the image information corresponding to one line according to the image processing parameter selected at step S3-3. In step S3-37, the data compression unit 22 compresses the image information from the image processing unit 32 corresponding to one line according to the algorithm and the compression parameter selected in step S3-3, and sends the compressed data to the external device 12 through the interface unit 1. Then, the process returns to step S3-34. Afterwards, step S3-34 to step S3-37 are repeated. After the image information corresponding to one block is read, the process jumps from step S3-34 to step S3-38.

In step S3-38, the reading-per-block unit 8-2 sets a data reading address in the buffer (2) 6. In step S3-39, the reading-per-block unit 8-2 determines whether the image information corresponding to one block is read from the buffer (2) 6. When it is determined that the reading is completed, the process proceeds to step S3-43. When it is determined that the reading is not completed, the process proceeds to step S3-40.

In step S3-40, when the image information exists in the buffer (2) 6, the process proceeds to step S3-41. In step S3-41, the reading-per-block unit 8-2 reads the image information corresponding to one line from the buffer (2) 6, and sends the image information to the image processing unit 32. The image processing unit 32 performs the image processing on the image information corresponding to one line according to the image processing parameter selected at step S3-3. In step S3-42, the data compression unit 22 compresses the image information from the image processing unit 32 corresponding to one line according to the algorithm and the compression parameter selected in step S3-3, and sends the compressed data to the external device 12 through the interface unit 1. Then, the process returns to step S3-39. Afterwards, step S3-39 to step S3-42 are repeated. After the image information corresponding to one block is read, the process jumps from step S3-39 to step S3-43.

In step S3-43, when the image information of a next block exists, the process returns to step S3-33. After step S3-33 to step S3-43 are repeated, when all of the image information per block of the original is read, the process proceeds to step S3-44. In step S3-44, when a next double side original exists, the process returns to step S3-33, and step S3-33 to step S3-44 are repeated. When all of the image information is read, the process stops.

As described above, in the third embodiment, with the image type selection unit 31 and the image processing unit 32, it is possible to increase the compression efficiency and reduce the transmission time to the external device 12, in addition to the advantages of the second embodiment.

In the third embodiment, the CPU 34 executes a specific program stored in the ROM 33-1 to start the reading condition receiving unit 2; the image reading unit 3; the A/D conversion unit 4; the reading mode selection unit 7; the data reading unit 8; the control unit 9; the compression mode selection unit 21; the data compression unit 22; the image type selection unit 31; and the image processing unit 32 disposed as the computer control units. The present invention is not limited to the configuration, and all or a part of the units may be replaced with a specific electric circuit.

Fourth Embodiment

In FIG. 2(A), it is assumed that the buffer (1) 5 and the buffer (2) 6 have the capacities capable of storing the image information corresponding to one page (Block A1 to Block A4, and Block B1 to Block B4). In the process shown in FIG. 2(A), while the image information of Block A1 to Block A4 is sequentially stored, the image information from Block A1 to Block A4 is concurrently read in this order. Accordingly, when the Block A3 is stored, Block A1 is already read, so that it is possible to store Block A3 in the area of Block A1. Likewise, when the Block A4 is stored, Block A1 is already read, so that it is possible to store Block A4 in the area of Block A1. That is, the buffer (1) 5 has an excess memory capacity (area where Block A3 and Block A4 can be stored).

While the image information is stored in the order of Block B1 to Block B4, the transmission is stopped. Accordingly, the buffer (2) 6 needs to have a memory capacity capable of storing the image information corresponding to one page (Block B1 to Block B4), otherwise it is not possible to select the reading-per-page mode. In the embodiment, when the buffer (2) 6 does not have a memory capacity capable of storing the image information corresponding to one page (Block B1 to Block B4), the excess memory capacity of the buffer (1) 5 is added to the memory capacity of the buffer (2) 6, thereby making it possible to select the reading-per-page mode.

Figure 19:
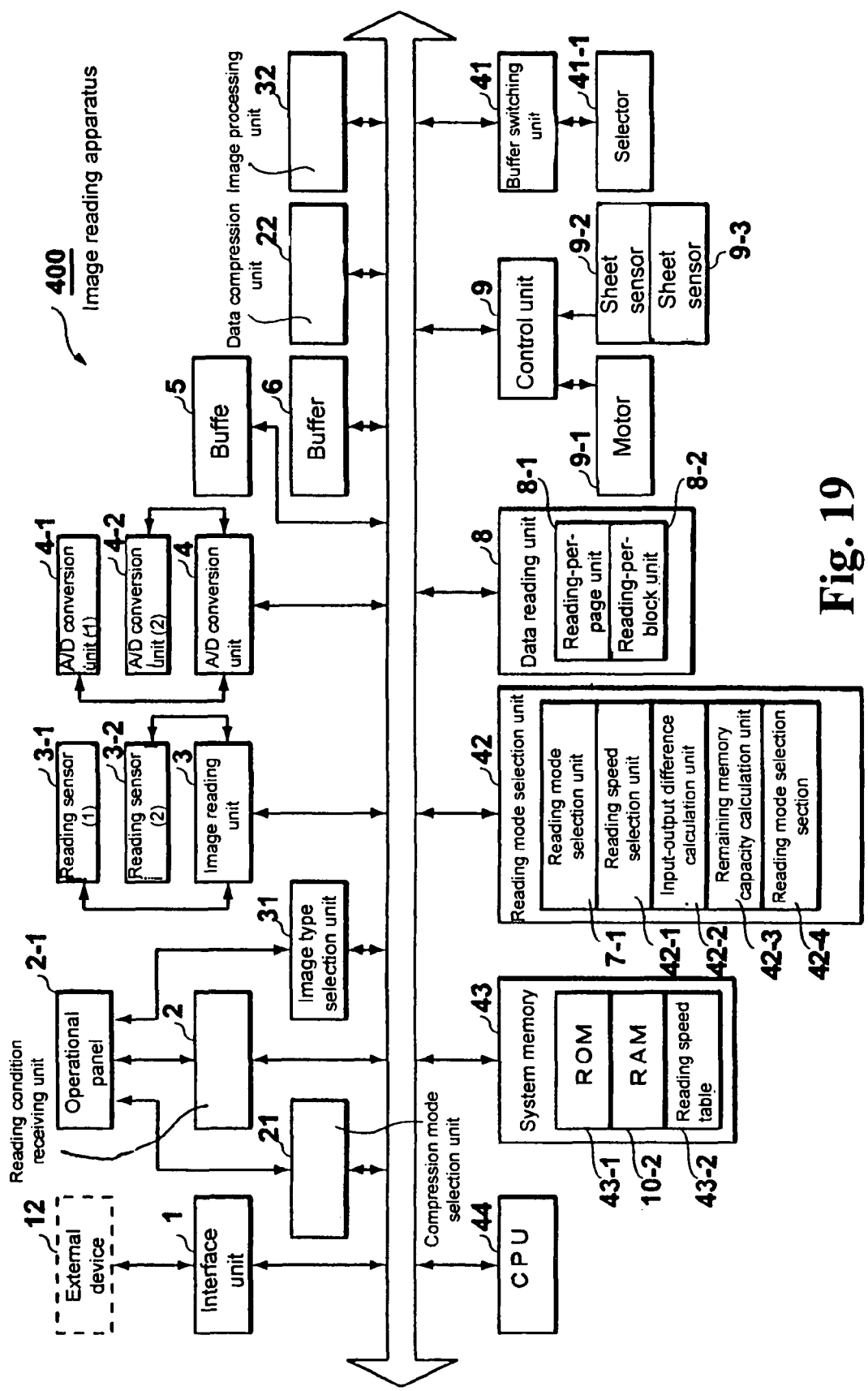
FIG. 19 is a schematic block diagram of an image reading apparatus according to a fourth embodiment of the present invention.

FIG. 19 is a schematic block diagram of an image reading apparatus 400 according to the fourth embodiment of the present invention. The image reading apparatus 400 includes the interface unit 1; the reading condition receiving unit 2; the image reading unit 3; the A/D conversion unit 4; the buffer 5; the buffer 6; the data reading unit 8; the control unit 9; the compression mode selection unit 21; the data compression unit 22; the image type selection unit 31; the image processing unit 32; a buffer switching unit 41; a reading mode selection unit 42; a system memory 43; and a CPU 44. Only components different from those in the first to third embodiments will be explained. Components same as those in the first to third embodiments are designated by the same reference numerals, and explanations thereof are omitted.

The buffer switching unit 41 monitors an empty memory capacity of the buffer (2) 6. When the empty memory capacity becomes zero, the buffer switching unit 41 operates a selector 41-1, so that the A/D conversion unit 4-2 is connected to the buffer (1) 5 from a state that the A/D conversion unit (1) 4-1 is connected to the buffer (1) 5 and the A/D conversion unit (2) 4-2 is connected to the buffer (2) 6.

The reading mode selection unit 42 includes the image information amount calculation unit 7-1; a reading speed selection unit 42-1; an input-output difference calculation unit 42-2; a remaining memory capacity calculation unit 42-3; and a reading mode selection section 42-4. The reading mode selection unit 42 selects one of the reading-per-page mode and the reading-per-block mode. The CPU 44 executes a specific program stored in an ROM 43-1 in advance to start the reading mode selection unit 42.

The reading speed selection unit 42-1 obtains a reading speed Vscan and a reading time Tscan corresponding to one page from a reading speed table 43-1 according to the image reading condition input in step S1-5 by the operator. The reading speed selection unit 42-1 also obtains a maximum reading speed Vmax of the external device 12 from the external device 12 for determining a reading speed Vread from the buffer (1) 5 and the buffer (2) 6.

The input-output difference calculation unit 42-2 calculates a difference between the reading speed Vscan and the reading speed Vread. The remaining memory capacity calculation unit 42-3 calculates a remaining memory capacity Y after the reading time Tscan. The reading mode selection section 42-4 selects one of the reading-per-page mode and the reading-per-block mode according to a calculation result of the reading mode selection unit 42-3.

The system memory 43 includes the ROM 43-1 for storing programs and control data necessary for controlling the image reading apparatus 400, and the RAM 10-2 having a working area for a computation process of the CPU 44. In the embodiment, the ROM 43-1 stores in advance the reading speed table 43-1 and programs for starting the reading condition receiving unit 2, the image reading unit 3, the A/D conversion unit 4, the data reading unit 8, the control unit 9, the compression mode selection unit 21, the data compression unit 22, the image type selection unit 31, the image processing unit 32, the buffer switching unit 41, and the reading mode selection unit 42 when the CPU 34 execute the programs.

FIG. 20 is a view showing the reading speed table. The table includes a relationship between the image reading conditions input in step S1-5 in FIG. 4 by the operator such as resolution 43-1-1, color number/color scale 43-1-2, and image size 43-1-3, and reading time 43-1-4 and reading speed 43-1-5.

The CPU 44 includes a microprocessor for controlling the image reading apparatus 400 with the system memory 43. In the embodiment, the CPU 34 executes the programs stored in the ROM 23-1 to start the reading condition receiving unit 2, the image reading unit 3, the A/D conversion unit 4, the data reading unit 8, the control unit 9, the compression mode selection unit 21, the data compression unit 22, the image type selection unit 31, the image processing unit 32, the buffer switching unit 41, and the reading mode selection unit 42.

An operation of the image reading apparatus 400 will be explained next. In the fourth embodiment, the operation of selecting the reading mode (step S1-6; FIG. 5) and the reading operation of the reading sensor (2) 3-2 (step S1-11; FIG. 7) are different from those in the first to third embodiments. Accordingly, only these steps will be explained, and explanations of the other steps are omitted.

Figure 21:
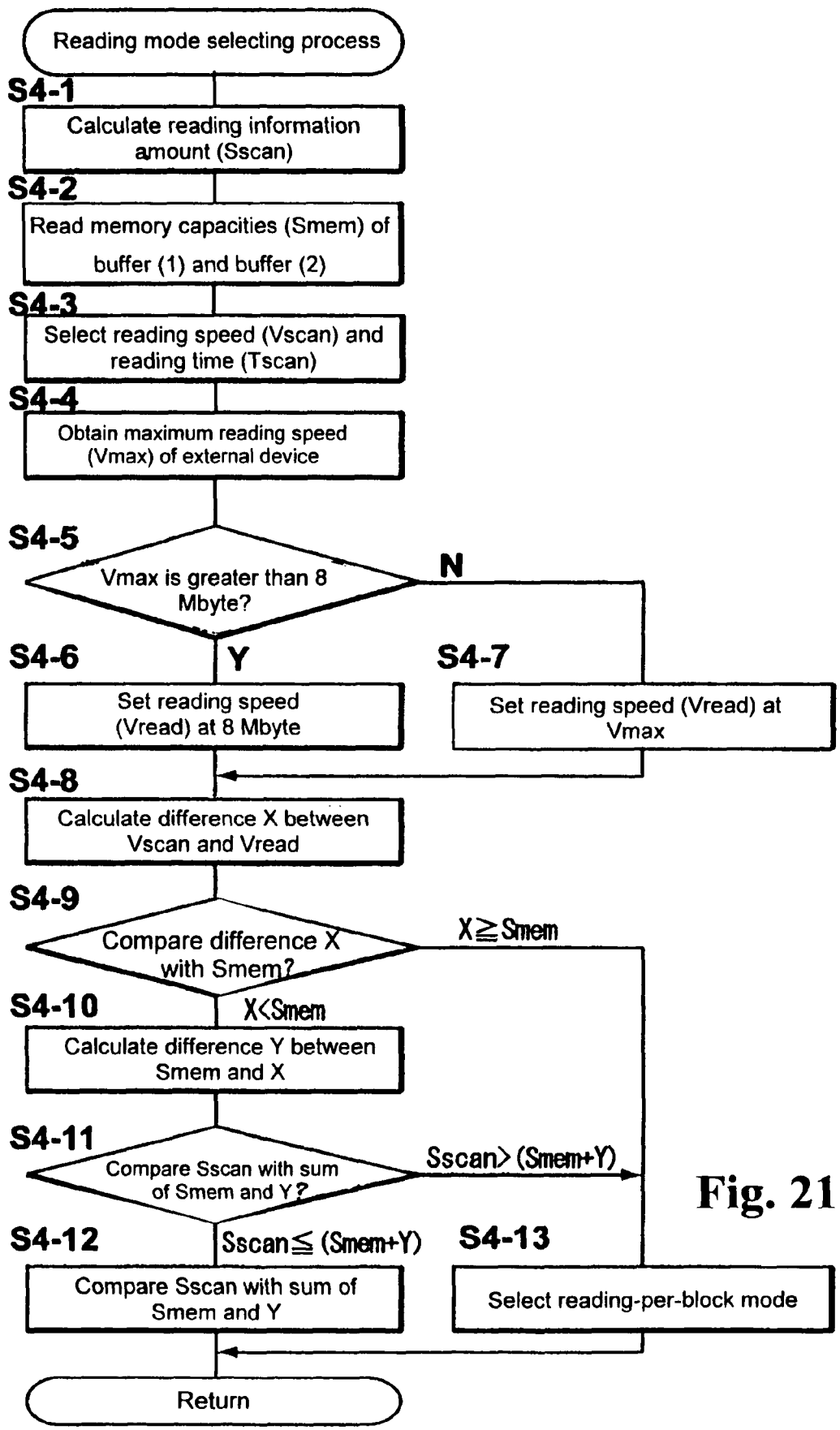
FIG. 21 is a flow chart showing a process of selecting a reading mode according to the fourth embodiment of the present invention.

FIG. 21 is a flow chart showing the operation of selecting the reading mode according to the fourth embodiment of the present invention. In step S4-1, the image information amount calculation unit 7-1 of the reading mode selection unit 42 (FIG. 19) calculates the reading information amount (Sscan) according to the image reading conditions selected by the operator, similar to the first embodiment. In step S4-2, the reading mode selection unit 42-1 of the reading mode selection unit 42 (FIG. 19) reads the memory capacities (Smem) of the buffer (1) 5 and the buffer (2) 6 (FIG. 19) from the ROM 43-1 (FIG. 19). In step S4-3, the reading mode selection unit 42-1 calculates the reading speed Vscan and the reading time Tscan from the system memory 43-1 (FIG. 20) according to the image reading conditions selected by the operator.

In step S4-4, the reading mode selection unit 42-1 obtains the maximum reading speed Vmax of the external device 12. In step S4-5, the process proceeds to step S4-6 when the maximum reading speed Vmax is equal to or greater than 8 Mbyte. When the maximum reading speed Vmax is smaller than 8 Mbyte, the process proceeds to step S4-7. The standard of 8 Mbyte is determined empirically, and not limited to this value.

In step S4-6, the reading mode selection unit 42-1 sets the reading speed Vread at 8 Mbyte. In step S4-7, the reading mode selection unit 42-1 set the reading speed Vread at the maximum reading speed Vmax of the external device 12. In step S4-8, the reading mode selection unit 42-2 of the reading mode selection unit 42 calculates a difference X between the readin speed Vscan and the reading speed Vread. The difference X represents an occupied memory capacity of the buffer (1) 5 after the reading time Tscan. In step S4-9, the reading mode selection unit 42-4 compares the difference X with the memory capacities Smem. The process proceeds to step S4-13 when the difference X is equal to or greater than the memory capacities Smem. When the difference X is smaller than the memory capacities Smem, the process proceeds to step S4-10.

In step S4-10, the reading mode selection unit 42-3 calculates a difference Y between the memory capacities Smem and the difference X. The difference Y represents the remaining memory capacity of the buffer (1) 5 after the reading time Tscan. In step S4-11, the reading mode selection unit 42-4 compares the reading speed Sscan with a sum of the memory capacities Smem and the difference Y. The process proceeds to step S4-12 when the reading speed Sscan is equal to or smaller than the sum of the memory capacities Smem and the difference Y. When the reading speed Sscan is greater than the sum of the memory capacities Smem and the difference Y, the process proceeds to step S4-13.

In step S4-12, the reading mode selection unit 42-4 selects the reading-per-page mode, and the process proceeds to S1-7. In step S4-13, the reading mode selection unit 42-4 selects the reading-per-block mode, and the process proceeds to S1-7.

Figure 22:
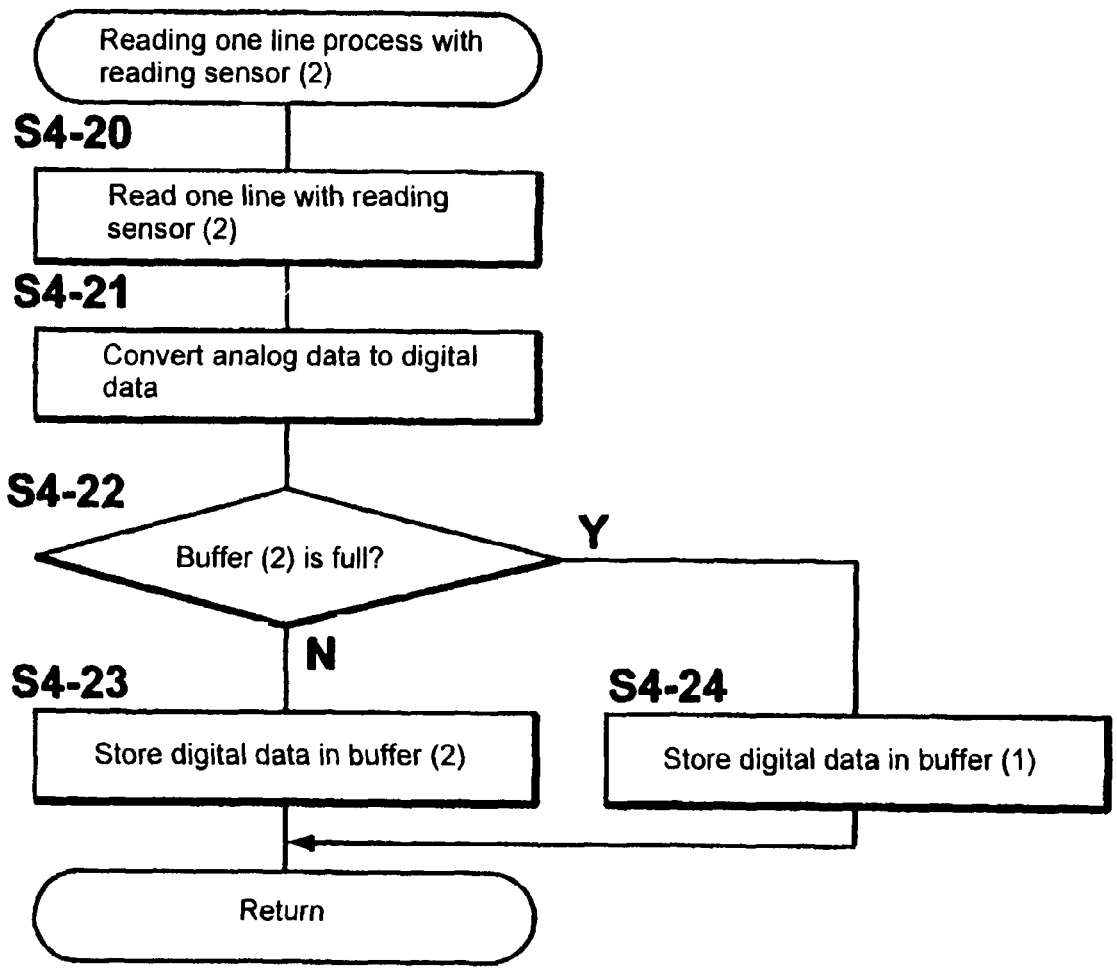
FIG. 22 is a flow chart view showing an operation of reading and storing according to the fourth embodiment of the present invention.

An operation of reading the image information (digital data) from the buffers will be explained next. FIG. 22 is a flow chart view showing an operation of reading and storing the image information (digital data) according to the fourth embodiment of the present invention.

In step S4-20, the image reading unit 3 controls the reading sensor (1) 3-1 (FIG. 19) to read one line of the image information (analog data) on the front side of the double side original 82. In step S4-21, the A/D conversion unit 4 controls the A/D conversion unit (1) 4-1 (FIG. 19) to convert the image information (analog data) to the digital data. In step S4-22, the buffer switching unit 41 (FIG. 19) monitors the empty memory capacity of the buffer (2) 6. When the empty memory capacity becomes zero, the process proceeds to step S4-24, otherwise to step S4-23.

In step S4-23, the A/D conversion unit 4 stores the output of the A/D conversion unit (2) 4-2 in the buffer (1) 5, and the process proceeds to step S1-12. In step S4-24, the A/D conversion unit 4 stores the output of the A/D conversion unit (2) 4-2 in the buffer (2) 6, and the process proceeds to step S1-12.

As described above, in the fourth embodiment, with the image information amount calculation unit 7-1, the reading mode selection unit 42-1, the reading mode selection unit 42-2, the reading mode selection unit 42-3, the reading mode selection unit 42-4 and the buffer switching unit 41, when the buffer (2) 6 does not have a memory capacity capable of storing the image information corresponding to one page (Block B1 to Block B4), the excess memory capacity of the buffer (1) 5 is added to the memory capacity of the buffer (2) 6, thereby making it possible to select the reading-per-page mode.

In the third embodiment, the CPU 44 executes a specific program stored in the ROM 43-1 to start the reading condition receiving unit 2; the image reading unit 3; the A/D conversion unit 4; the data reading unit 8; the control unit 9; the compression mode selection unit 21; the data compression unit 22; the image type selection unit 31; the image processing unit 32; the buffer switching unit 41; and the reading mode selection unit 42 disposed as the computer control units. The present invention is not limited to the configuration, and all or a part of the units may be replaced with a specific electric circuit.

Fifth Embodiment

The image reading apparatus according to the first to fourth embodiment are explained with reference to FIGS. 1, 10, 14, and 19. In the fifth embodiment, an image forming system formed of the external device 12 and the image reading apparatus 100 shown in FIG. 1 will be explained.

Figure 23:
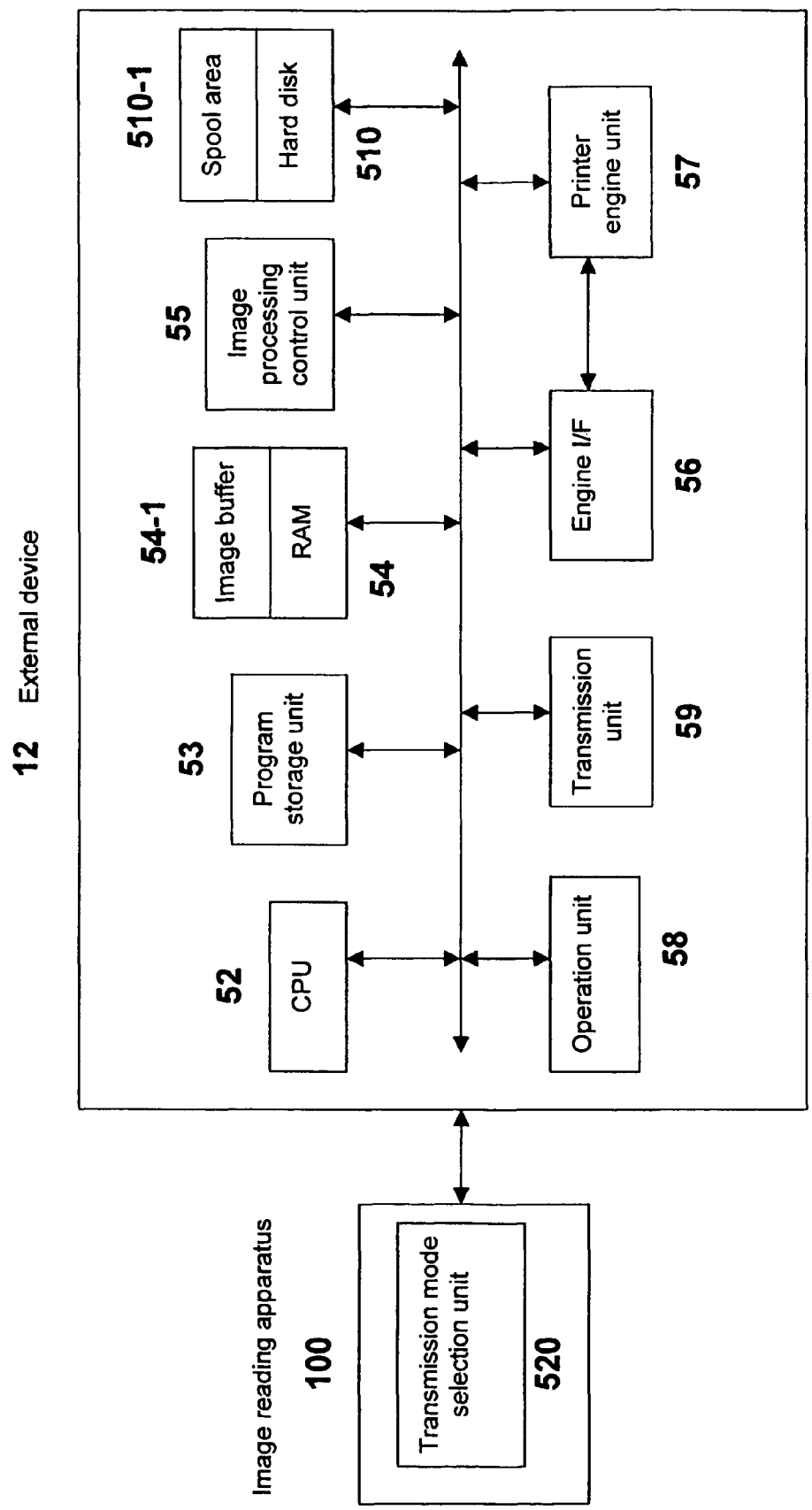
FIG. 23 is a schematic block diagram of an image forming system formed of an image reading apparatus and an external device.

FIG. 23 is a schematic block diagram of the image reading system formed of the image reading apparatus 100 and the external device 12 according to the fifth embodiment of the present invention. The image reading apparatus 100 is provided with a transmission mode selection unit 520. The transmission mode selection unit 520 selects a transmission mode, i.e., transmission per page or per block, when the image data is sent to the external device 12. In the embodiment, the external device 12 is a printer having a CPU 52; a program storage unit 53; an RAM 54; an image processing control unit 55; an engine I/F 56; a printer engine unit 57; an operation unit 58; a transmission unit 59; and a hard disk 510.

The CPU 52 includes a microprocessor for controlling the external device 12 with the system memory 23. In the embodiment, the CPU 24 executes a program (firmware) stored in the program storage unit 53. The RAM 54 is a main memory of the CPU 52, and temporarily stores information necessary for executing the program. The CPU 52 controls the image processing control unit 55 to expand PDL data into image data to be stored in an image buffer 54-1 in the RAM 54.

The engine I/F 56 is an interface unit for communicating with the printer engine unit 57. The CPU 52 controls the engine I/F 56 to output the image data stored in the image buffer 54-1 to the printer engine unit 57, so that the printer engine unit 57 print a recording sheet (not shown). The operation unit 58 includes a liquid crystal panel for displaying a status and information of the external device 12 and an operation key (not shown) for an operator to change a menu and input information. The transmission unit 59 communicates with the image reading apparatus 100, i.e., an upper level device, and receives the image data from the image reading apparatus 100 as a printing job. The image data is stored in a spool 510-1 of the hard disk 510.

An operation of the external device 12 of the image forming system shown in FIG. 23 will be explained next. The transmission mode selection unit 520 selects the per-page mode or the per-block mode, and the image information read at the image reading apparatus 100 is sent to the external device 12 through the transmission unit 59. The transmission unit 59 determines whether the image information is read per-page or per-block. When it is determined that the image information is read per-page, the image information is stored in the spool 510-1 of the hard disk 510. Then, the CPU 52 controls the image processing control unit 55 to expand the image information per page into image data to be stored in the image buffer 54-1 in the RAM 54.

When it is determined that the image information is read per-block, the image information is sequentially stored in the spool 510-1 of the hard disk 510. Once the image information per block is accumulated to form the image information corresponding to one page, the CPU 52 controls the image processing control unit 55 to expand the image information per page into image data to be stored in the image buffer 54-1 in the RAM 54. The spool 510-1 is not necessarily located in the hard disk 510, and may be located in a non-volatile memory such as a Flash memory.

The image data need not to be stored for long time. That is, as far as it is possible to transmit data same as the stored image data from the image reading apparatus 100 when the external device 12 is turned off, the image data may be stored in a volatile memory such as the RAM 54. The CPU 52 controls the engine I/F 56 to output the image data stored in the image buffer 54-1 to the printer engine unit 57, so that the printer engine unit 57 print a recording sheet (not shown).

In the embodiments described above, the present invention is applied to the scanner, and may be applied to other devices such as an image forming apparatus, a multi-purpose device, a copier, a facsimile, and an optical text reading device to constitute an image reading system.

The disclosure of Japanese Patent Application No. 2004-333946, filed on Nov. 18, 2004, is incorporated in the application.

While the invention has been explained with reference to the specific embodiments of the invention, the explanation is illustrative and the invention is limited only by the appended claims.

What is claimed is:

1. An image reading apparatus for reading an original, comprising:
a reading condition receiving unit for receiving a reading condition;
a first image reading unit for reading one side of the original according to the reading condition to obtain first image information;
a second image reading unit for reading the other side of the original according to the reading condition to obtain second image information while the first image reading unit reads the one side of the original;
a first storage unit having a first memory capacity for storing the first image information;
a second storage unit having a second memory capacity for storing the second image information;
a reading mode selection unit for selecting one of a first reading mode and a second reading mode according to a result of comparison between an image information amount corresponding to the reading condition and the first memory capacity and the second memory capacity, said reading mode selection unit selecting the second reading mode when the image information amount is greater than the first memory capacity and the second memory capacity, said reading mode selection unit selecting the first reading mode when the image information amount is equal to or smaller than the first memory capacity and the second memory capacity; and
a data reading unit for reading the first image information and the second image information from the first storage unit and the second storage unit according to the one of the first reading mode and the second reading mode, said data reading unit reading first page data of the first image information and second page data of the second image information per page in the first reading mode, said data reading unit reading first block data and second block data of the first image information and third block data of the second image information per block smaller than the page in the second reading mode, wherein said data reading unit is arranged to send the first page data while storing the the first page data in the first storage unit, and to send the second page data after the first page data is sent while storing the second page data in the second storage unit when the reading mode selection unit selects the first reading mode, and said data reading unit is arranged to send the first block data while storing the first block data and the second block data in the first storage unit, to send the third block data after the first block data is sent while storing the third block data in the second storage unit, and to send the second block data after the third block data is sent when the reading mode selection unit selects the second reading mode.

2. The image reading apparatus according to claim 1, further comprising an image information amount calculation unit for calculating the image information amount.

3. The image reading apparatus according to claim 1, further comprising an image processing unit for processing the first image information and the second image information according to a specific processing mode.

4. The image reading apparatus according to claim 3, further comprising an image compression unit for compressing an output of the image processing unit according to a specific compression mode.

5. The image reading apparatus according to claim 1, wherein said image reading apparatus constitutes a scanning device or a facsimile.

6. An image reading apparatus for reading an original, comprising:
 a reading condition receiving unit for receiving a reading condition;
 a reading speed information storage unit for storing an image reading speed and an image reading time corresponding to the reading condition in advance;
 a first image reading unit for reading one side of the original according to the reading condition to obtain first image information;
 a second image reading unit for reading the other side of the original according to the reading condition to obtain second image information while the first image reading unit reads the one side of the original;
 a first storage unit having a first storage capacity for storing the first image information;
 a second storage unit having a second storage capacity for storing the second image information;
 an image information amount calculation unit for calculating an image information amount corresponding to the reading condition;
 a reading mode selection unit for selecting one of a first reading mode and a second reading mode;
 a reading speed selection unit for selecting a data reading speed for reading the first image information from the first storage unit in the first reading mode;
 a remaining memory capacity calculating unit for calculating a remaining memory capacity of the first storage unit according to the image reading speed, the image reading time, and the data reading time; and
 a data reading unit for reading the first image information and the second image information from the first storage unit and the second storage unit according to the one of the first reading mode and the second reading mode, said data reading unit reading first page data of the first image information and second page data of the second image information per page in the first reading mode, said data reading unit reading first block data and second block data of the first image information and third block data of the second image information per block smaller than the page in the second reading mode, said data reading unit sending the first page data while storing the first page data in the first storage unit, and sending the second page data after the first page data is sent while storing the second page data in the second storage unit when the reading mode selection unit selects the first reading mode, wherein said data reading unit is arranged to send the first block data while storing the first block data and the second block data in the first storage unit, to send third block data after the first block data is sent while storing the third block data in the second storage unit, and to send the second block data after the third block data is sent when the reading mode selection unit selects the second reading mode.

7. The image reading apparatus according to claim 6, wherein said reading mode selection unit selects the second reading mode when the image information amount is greater than a sum of the remaining memory capacity and the second memory capacity.

8. The image reading apparatus according to claim 6, wherein said reading mode selection unit selects the first reading mode when the image information amount is equal to or smaller than a sum of the remaining memory capacity and the second memory capacity.

9. The image reading apparatus according to claim 6, wherein said reading speed selection unit selects the data reading speed such that the data reading speed becomes smaller than a data receiving speed of an external device to which the first image information and the second image information are sent.

10. The image reading apparatus according to claim 6, further comprising an image processing unit for processing the first image information and the second image information according to a specific processing mode.

11. The image reading apparatus according to claim 10, further comprising an image compression unit for compressing an output of the image processing unit according to a specific compression mode.

12. The image reading apparatus according to claim 6, wherein said image reading apparatus constitutes a scanning device or a facsimile.

13. An image forming system comprising the image reading apparatus according to claim 1.

14. An image forming system comprising the image reading apparatus according to claim 6.

* * * * *